(12) United States Patent
Frey et al.

(10) Patent No.: US 6,725,392 B1
(45) Date of Patent: Apr. 20, 2004

(54) CONTROLLER FAULT RECOVERY SYSTEM FOR A DISTRIBUTED FILE SYSTEM

(75) Inventors: Alexander H. Frey, Wayzata, MN (US); Leonard Olson, Lino Lakes, MN (US); William A. P. Graham, Minnetrista, MN (US)

(73) Assignee: Adaptec, Inc., Milpitas, CA (US)

( * ) Notice: Subject to any disclaimer, the term of this patent is extended or adjusted under 35 U.S.C. 154(b) by 528 days.

(21) Appl. No.: 09/691,579

(22) Filed: Oct. 18, 2000

Related U.S. Application Data

(63) Continuation-in-part of application No. 09/261,708, filed on Mar. 3, 1999, and a continuation-in-part of application No. 09/439,440, filed on Nov. 15, 1999, now Pat. No. 6,530,036.

(51) Int. Cl.[7] .............................................. G06F 11/00
(52) U.S. Cl. ............................................. 714/6; 714/15
(58) Field of Search .............................. 714/6, 15, 16, 714/17, 43; 711/114

(56) References Cited

U.S. PATENT DOCUMENTS

| 4,633,245 A | 12/1986 | Blount et al. |
|---|---|---|
| 4,722,085 A | 1/1988 | Flora et al. |
| 4,817,035 A | 3/1989 | Timsit |
| 5,001,628 A | 3/1991 | Johnson et al. |
| 5,113,518 A | 5/1992 | Durst, Jr. et al. |
| 5,130,992 A | 7/1992 | Frey, Jr. et al. |
| 5,327,553 A | 7/1994 | Jewett et al. |
| 5,390,327 A | 2/1995 | Lubbers et al. |
| 4,761,785 A | 3/1996 | Clark et al. |
| 5,497,457 A | 3/1996 | Ford |
| 5,511,177 A | 4/1996 | Kagimasa et al. |
| 5,513,314 A | 4/1996 | Kandasamy et al. |
| 5,513,459 A | 5/1996 | Schneider |
| 5,522,031 A | 5/1996 | Ellis et al. |
| 5,522,032 A | 5/1996 | Franaszek et al. |

(List continued on next page.)

FOREIGN PATENT DOCUMENTS

| EP | 0571169 B1 | 1/2000 |
|---|---|---|
| EP | 0709779 B1 | 5/2001 |
| WO | WO 97/22054 | 6/1997 |
| WO | WO 99/08173 A3 | 2/1999 |
| WO | WO 99/09479 | 2/1999 |

OTHER PUBLICATIONS

*Raid Technology: The Storage Solution*, an nStor Report, 19 pgs.; not dated.
Web site print–out: *Net Engineer; RAID Technology*, 5 pgs., not dated.

(List continued on next page.)

*Primary Examiner*—Scott Baderman
(74) *Attorney, Agent, or Firm*—Martine & Penilla, LLP

(57) ABSTRACT

A controller fault recovery system recovers from faults that cause unscheduled stops for a distributed file system operating on an array storage system having multiple controllers. A proxy arrangement protects data integrity in the event of an unscheduled stop on just one controller in the array storage system. An atomic data/parity update arrangement protects data integrity in the event of an unscheduled stop of more than one controller.

22 Claims, 19 Drawing Sheets

U.S. PATENT DOCUMENTS

| | | |
|---|---|---|
| 5,524,204 A | 6/1996 | Verdoorn, Jr. |
| 5,524,205 A | 6/1996 | Lomet et al. |
| 5,546,535 A | 8/1996 | Stallmo et al. |
| 5,574,882 A | 11/1996 | Menon et al. |
| 5,615,352 A | 3/1997 | Jacobson et al. |
| 5,623,595 A | 4/1997 | Bailey |
| 5,692,178 A | 11/1997 | Shaughnessy |
| 5,751,928 A | 5/1998 | Bakalash |
| 5,758,118 A | 5/1998 | Choy et al. |
| 5,826,001 A | 10/1998 | Lubbers et al. |
| 5,848,229 A | 12/1998 | Morita |
| 5,875,456 A | 2/1999 | Stallmo et al. |
| 5,875,457 A | 2/1999 | Shalit |
| 5,890,156 A | 3/1999 | Rekieta et al. |
| 5,924,126 A | 7/1999 | Rosenthal et al. |
| 5,933,592 A | 8/1999 | Lubbers et al. |
| 5,933,834 A | 8/1999 | Aichelen |
| 5,944,838 A | 8/1999 | Jantz |
| 5,960,446 A | 9/1999 | Schmuck et al. |
| 5,975,738 A | 11/1999 | DeKoning et al. |
| 5,987,506 A | 11/1999 | Carter et al. |
| 5,999,930 A | 12/1999 | Wolff |
| 6,000,010 A | 12/1999 | Legg |
| 6,021,463 A | 2/2000 | Belser |
| 6,029,168 A | 2/2000 | Frey |
| 6,032,216 A | 2/2000 | Schmuck et al. |
| 6,035,373 A | 3/2000 | Iwata |
| 6,041,423 A | 3/2000 | Tsukerman |
| 6,058,400 A | 5/2000 | Slaughter |
| 6,098,119 A | 8/2000 | Surugucchi et al. |
| 6,148,383 A * | 11/2000 | Micka et al. ............... 711/162 |
| 6,256,643 B1 | 7/2001 | Cork et al. |
| 6,446,237 B1 * | 9/2002 | Menon ....................... 714/800 |
| 6,449,731 B1 * | 9/2002 | Frey, Jr. ......................... 714/9 |
| 6,530,036 B1 * | 3/2003 | Frey, Jr. ......................... 714/6 |

OTHER PUBLICATIONS

Web site print–out: *The RAB Guide To Non–Stop Data Access*, Joe Molina, RAB Chairman, RAB™, 17 pgs., not dated.

TRANSARC™ Website print–out: *The AFS System In Distributed Computing Environments*, IBM Transarc, Pittsburgh, Pennsylvania, 10 pgs.; not dated.

TRANSARC™ Website print–out: *The AFS System In Distributed Computing Environments*, Transarc Corporation, Pittsburgh, Pennsylvania, 8 pgs.; May 1996.

Network Appliance, Inc. Website print–out: *The Network Appliance Enterprise Storage Architecture: System and Data Availability*, Michael J. Marchi, Andy Watson, Network Appliance, Inc., 11 pgs.; Copyright 2000.

Paper: *The Architecture of the High Performance Storage System (HPSS)*, Danny Teaff, Dick Watson, Bob Coyne, 24 pgs.; not dated.

Paper: *Scalability and Performance in Modern File Systems*, Philip Trautman, Jim Mostek, 24 pgs.; not dated.

Brochure: *Foundation Suite™ VERITAS Volume Manager and VERITAS File System*, Veritas Software Corporation, 4 pgs.; Copyright 1999.

*The Design of the Postgres Storage System*, Michael Stonebreaker, Proceedings of the $23^{rd}$ VLDB Conference, Brighton, pp. 289–300, 1987.

*The Recovery Box: Using Fast Recovery to Provide High Availability in the UNIX Environment*, Mary Baker, Mark Sullivan, Proceedings of the Summer 1992 USENIX Technical Conference, San Antonio, Texas; pp. 31–43; Jun. 1992.

*Severless Network File Systems*, T. Anderson, M. Dahlin, J. Neefe, D. Patterson, D. Roselli , R. Wang, ACM Transactions on Computer Systems, vol. 14, No. 1, pp. 41–79, Feb. 1996.

*The Zebra Striped Network File System*, J. Hartman, J. Outsterhout, ACM Transactions on Computer Systems, vol. 13, No. 3, pp. 274–310, Aug. 1995.

* cited by examiner

Fig. 15

| Fig. 15A |
|---|
| Fig. 15B |

Fig. 15A

Time-line for a Data Write and Its Parity Update

| At the Data IOM | Msg | At the Parity IOM |
|---|---|---|
| Read old data with flags = DP_DONTBLOCK \|\| PF_BC_READAHEAD \|\| PF_BC_CREATE. | | |
| Call modifyBlock getting a dirty buffer to hold new data transferred from caller (with a new disk address if needed). | | |
| Make a journal entry for the write with a new ID = mj and the GFID, lblk, and new and old disk addresses for data. | | |
| Transfer data into buffer. Set write_start and write_bytes to indicate the range of dirty bytes in the buffer that must be parity updated. | | |
| Mark buffer tough and write data to disk with flags = DP_DONTBLOCK. | | |
| Reply to caller if Toughness 0. | | |
| Send ios_updatepn request to parity node with write_start, write_bytes, journal (mj & contents). | → | Receive ios_updatepn request. |
| Merge new data with old-data if necessary. | | Get buffer for parity delta or data. |
| Compute parity delta or data (in a new buffer if necessary). | | Write a new journal entry, pj, containing parity GFID, lblk, new and old disk addresses, and |

Fig. 15B

| | | |
|---|---|---|
| | | data of mj (i.e., mj, GFID, lblk, new and old disk address) with flags = DP_DONTBLOCK. |
| Receive request for parity delta or data, or the parity journal data. | ← | |
| | → | Request new parity delta or data. |
| Return the parity delta. Then release the old data/delta buffer. | | If needed, get old-parity with flags = DP_DONTBLOCK || PF_BC_READAHEAD |
| | | Receive the parity delta in the new parity buffer. |
| Reply to caller if Toughness 1. | | Merge the parity delta or data with the old parity buffer if needed. Then write new parity to disk with flags = DP_DONTBLOCK. |
| When new data buffer is on disk, mark new data disk address in the cnode or indirect. Mark mj in their and the bitmap's pf_jmrange.newest. | → | When new parity buffer is on disk, mark the new disk address and pj in pf_jmrange.newest of the parity cnode or indirect buffer and of the bitmap. |
| When mj and the new data buffer are on disk, send data hardened message to the parity node. | | Send parity update hardened message to the data node. |
| Receive the hardened message from the parity node. If error, send update_pn to parity proxy. | ← | |
| Reply to caller if Toughness 2. | | Receive the hardened msg from the data node. |
| Deallocate the old data disk address if any and journal the mj_complete entry. | | Finally, deallocate the old parity disk address if any and journal the pj_complete entry. |

NO OLD DATA CHUNKS

PARTY HAS OLD CHUNK

DATA HAS OLD CHUNK

BOTH PARITY AND DATA HAVE OLD CHUNKS

CONTROLLER FAULT RECOVERY SYSTEM FOR A DISTRIBUTED FILE SYSTEM

RELATED APPLICATIONS

The present invention is continuation-in-part of two co-pending applications that are commonly assigned to the assignee of the present invention, the first of which is entitled "Computer Storage System," Ser. No. 09/261,708, filed Mar. 3, 1999, and the second of which is entitled "Self-Healing Computer Storage System", Ser. No. 09/439, 440, filed Nov. 15, 1999, now U.S. Pat. No. 6,530,036 a copy of each of which is attached and the disclosure of both of which is incorporated by reference.

FIELD OF THE INVENTION

The present invention relates generally to the field of array storage devices in computer processing systems and networks. More specifically, the present invention relates to a controller fault recovery system for recovering from faults that cause unscheduled stops for a distributed file system operating on an array storage system having multiple controllers that provides for a proxy arrangement to protect data integrity in the event of a unscheduled stop on just one controller in the array storage system and for an atomic data/parity update arrangement to protect data integrity in the event of an unscheduled stop of more than one controller.

BACKGROUND OF THE INVENTION

The use of array storage systems to store data in computer processing systems and networks is well known. Five different classes of architectures of array storage systems are described under the acronym "RAID" (Redundant Array of Independent/Inexpensive Disks). The primary purpose of a RAID system is to detect corrupted data, and, depending upon the class of the RAID system and the extent of the data corruption, use the data stored on other drives in the disk array to correct the corrupted data. In a RAID 5 disk array, for example, a parity technique is used that protects against the failure of a single one of the disk drives that make up the disk array. Data is written to the disk array in multiple data blocks with a defined number of data blocks (N) making up a parity group. Each parity group is protected by a parity block which is also written to the disk array. The parity block is generated by an exclusive or (XOR) operation on all of the data blocks in the parity group. When the parity group is read, the XOR operation is performed on the data blocks for the parity group and the results are compared with the results stored in the parity block to detect potential corrupted data. In a RAID 5 disk array, each of the data blocks in a parity group, as well as the parity block, is stored on a different disk drive. Therefore, there are a minimum of N+1 disk drives in the RAID 5 array for a parity group having N data blocks. In other words, for a disk array having N disk drives, there can be only N−1 data blocks in a parity group.

Due to the large amount of processing that can be required to implement error detection or error correction techniques, most existing array storage systems are implemented as a set of disks uniquely attached to and managed by a specialized hardware disk controller. In addition to the normal buffers and input/output circuitry required for passing data between a requestor and the disk array, the specialized disk controllers will typically have additional hardware, such as XOR hardware circuitry for computing parity and nonvolatile RAM (NVRAM) for caching and logging. These type of array storage systems are often referred to as hardware RAID systems.

The use of error detection and error correction techniques in RAID systems was initially thought to provide a sufficient level of reliability for these storage systems. Unfortunately, even RAID systems are susceptible to corruption in the event of an unscheduled stop due to a hardware or software error if it occurs during the period when updates or modifications are being made to either a data block or a parity block. Because there is a relatively high correlation of unscheduled stops with hardware faults that may prevent all of the drives in a disk array from being accessed, after such an unscheduled stop, it is often necessary for the system to reconstruct data on a lost drive. For example, if one drive out of a four drive RAID 5 disk array is inaccessible after an unscheduled stop, it will be necessary to reconstruct all of the information on that lost drive using the data and parity on the remaining three drives. If the unscheduled stop occurs during a period when updates or modifications are being made, the problem is deciding what are the proper contents of the blocks in the parity group on the remaining three drives that should be used to reconstruct the data. For example, if a new data block was written before a crash, but the corresponding new parity block was not, then the recovered data would be inaccurate if the information on the lost drive were to be reconstructed with the new data block contents and the old parity block contents.

The problem of knowing which data/parity blocks were successfully written and which were not is compounded by the fact that the buffers of the controller store data in volatile RAM memory during the relatively long period (of unpredictable length) required to actually write the data to the disk array. In the event of an unscheduled stop during this period, the data may or may not have been written to the disk array, and the contents in the volatile RAM memory are lost. Many hardware RAID systems choose to ignore this problem and reconstruct the data from whatever contents of the data and parity blocks are present on the remaining drives. Other systems recognize the problem and attempt to reconstuct a version of the lost data using a predetermined data pattern as described in U.S. Pat. No. 5,933,592. Some hardware RAID systems solve this problem by performing actions in order and using the NVRAM to maintain a log of the actions as they are performed. If an unscheduled stop or error occurs, then the controller plays back the log in the NVRAM and attempts to restore the data to a known state. An example of this type of error recovery using non-volatile storage in the controller is described in U.S. Pat. No. 6,021,463. Other examples include the Enterprise Storage system from Network Appliance that uses the WAFL file system and a non-volatile RAM to keep a log of all requests processed since the last consistency point (i.e., every 10 seconds or so a snapshot of the file system is stored in the NVRAM), and the SPRITE file system from the University of California, Berkeley that used a non-volatile recovery box to store critical system information.

While hardware RAID systems can be effective in solving many of the problems of array storage systems, such systems can be expensive, complicated and less efficient than non-RAID storage systems. The use of NVRAM to periodically store file system information does allow for recovery at each consistency point, but does nothing to avoid or minimize the loss of data resulting from errors occurring between such consistency points. Additionally, the ability to scale hardware RAID systems or use hardware RAID systems in a larger network environment can be limited. In an effort to decrease the cost and complexity of hardware RAID systems, software implementations of RAID systems have been developed for use with disk arrays that have relatively simple hardware controllers.

Most software RAID systems are implemented as part of a centralized file system that governs how the data is to be stored. However, such software RAID systems are subject to the same problems as the hardware RAID systems described above. Software RAID systems can be designed to recover from an unscheduled stop when all of the disks are available after the unscheduled stop by scanning all of the data on the system and performing error detection or parity checks to verify the accuracy of the data. Unfortunately, the amount of time required for this kind of recovery can be very lengthy. To solve the problem of having to scan all of the data for accuracy in the event of an unscheduled stop or error, some software RAID systems use a bit map stored along with the control information or meta-data for a file to indicate whether the parity for the data blocks that make up that file is accurate. Examples of the use of such parity bit maps are described in U.S. Pat. Nos. 5,574,882 and 5,826,001.

Though parity bit maps can be effective in decreasing the time required for recovery, parity bit maps do not address the problem of whether data in the buffers of the controller was successfully written to the disk array. One solution to this problem is described in U.S. Pat. No. 6,041,423 that uses undo/redo logging to perform asynchronous updates of parity and data in an array storage system. This patent uses a centralized file system that maintains a version number for each page or block of data or parity. Software in the controller creates a log of changes between versions of each page. Updates to parity are made asynchronous to writing data to the storage array and are preferably deferred and accumulated in order to improve performance. Other examples of logging for centralized file systems include the Veritas File System which attempts to enable constant file system data integrity by maintaining information on incomplete metadata changes in an intent log, the XFS file system from Silicon Graphics which provides asynchronous metadata logging to ensure rapid crash recovery, and the Structured File Server for the AFS file system from IBM/Transarc which provides a metadata manager that uses B-tree clustered file records and mirrors all metadata for reliability.

In a centralized file system these techniques are implemented and managed at a single controller or node. The use of a distributed or shared file system involving multiple storage nodes that can be accessed by multiple requesters; however, further complicates the challenges of providing accurate high performance data storage that can be recovered or reconstructed in the event of an unscheduled stop. One such parallel file system that uses a common meta-data node for storing meta-data is described in U.S. Pat. Nos. 5,960,446 and 6,032,216. A distributed file system that uses a decentralized meta-data system is described in U.S. Pat. No. 6,029,168.

One of the problems encountered in a distributed or shared file system is the problem of insuring that only one requestor accesses a file at a time which is sometimes referred to as coherency. U.S. Pat. No. 6,058,400 describes a cluster coherent distributed file system that coordinates the storage of meta-data by providing a cluster file system which overlays a plurality of local file systems. This patent solves the problems of coherency by selectively flushing meta-data for a file stored in the controller of one of the storage nodes to disk. U.S. Pat. No. 5,999,930 describes the use of a common control process and control table to allow clients to obtain exclusive write access control over a data storage volume to solve the problem of coherency. While these technique addresses the problem of coherency on a volume or file level, they do not provide a solution to maintaining coherency between different controllers or storage nodes that each have blocks of data and/or parity stored as part of a parity group under control of a distributed file system.

In the context of insuring coherency between parity and data updates in a parity group stored under control of a distributed file system having centralized metadata, the logging and mirroring techniques previously described are used to protect the centralized metadata. When a logging technique is used, a single log of all transactions on the parity disk is maintained as an additional tool to aid in the proper reconstruction of data and parity in the event of an unscheduled stop. When used in RAID 5, there is one journal entry for an entire parity group that keeps track of whether the parity group has a parity update in progress. If a parity update is in progress and an unscheduled stop occurs, then the log is examined in an attempt to reconstruct the parity block. The problem when there are multiple controllers responsible for writing information to the disks is that there is no way to know whether the recovery will be correct because there is no way of knowing if the changes that are logged for the parity disk were actually made and completed for the data disks. Depending upon the nature of the unscheduled stop and whether the data changes were actually made, these techniques may or may not be sufficient to appropriately reconstruct data or parity in a parity group.

Although techniques have been developed to maintain consistency and enable efficient reconstruction of data in the event of an unscheduled stop for hardware and software array storage systems having a single centralized controller, it would be desirable to provide a solution to these problems for a distributed file system in the context of a software-implemented array storage system having multiple controllers.

SUMMARY OF THE INVENTION

The present invention provides a controller fault recovery system for recovering from faults that cause unscheduled stops for a distributed file system operating on an array storage system having multiple controllers. A proxy arrangement protects data integrity in the event of an unscheduled stop on just one controller in the array storage system. An atomic data/parity update arrangement protects data integrity in the event of an unscheduled stop of more than one controller.

In the present invention, an array storage system stores data objects (e.g., files) that are arranged with at least one parity group having a number N of data blocks and a parity block computed from the N data blocks. The array storage system includes an array of storage devices and at least N+1 controllers, where each controller operably controls a unique portion of the array of storage devices. Preferably, a controller is a software-implemented controller comprised of a programmed process running on a computing device. A distributed file system is used to manage the array storage system and has at least one input/output manager (IOM) routine for each controller. Each IOM routine includes a software routine for controlling access to the unique portion of the array of storage devices associated with that controller. Software for the controller fault recovery system that is part of each IOM routine maintains a journal reflecting a state of all requests and commands received and issued for that IOM routine.

In response to a notification that at least one of the IOM routines has experienced an unscheduled stop, the controller fault recovery system in the IOM routine reviews the journal and the state of all requests and commands received and issued for that IOM routine and publishes any unfinished request and commands for the failed IOM routine(s). Publication may be accomplished by sending a message, setting a flag or otherwise communicating to any or all of the IOMs, including the IOM making the publication. The notification may be an external notification that a single IOM has failed, in which case the distributed file system keeps running and the fault recovery system uses a proxy arrangement to recovery; or, the notification may be that all of the IOMs experienced an unscheduled stop because more than one IOM has failed, in which case the distributed file system is restarted and the notification occurs internally as part of the restart procedure for each IOM.

Under the proxy arrangement, the distributed file system assigns a proxy IOM routine for each IOM routine, the proxy IOM routine being an IOM routine different than the assigned IOM routine. The proxy IOM routine includes software for monitoring the assigned IOM routine for a failure and, in the event of a failure of only the assigned IOM routine, issuing a notification to all other IOM routines. The proxy IOM routine then receives from all other IOM routines the publication of any unfinished requests or commands for the assigned IOM routine that has failed. Software in the proxy IOM routine marks in a meta-data block for the assigned IOM routine a state of any data blocks, parity blocks or meta-data blocks associated with the unfinished requests or commands reflecting actions needed for each such block when the assigned IOM routine recovers.

Under the atomic data/parity update arrangement, the distributed file system performs an unscheduled stop of all IOM routines in the event of a failure of more than one of the IOM routines. Upon recovery of at least N of the IOM routines after the unscheduled stop, each IOM routine reviews the journal and state for that IOM routine and the publication of any unfinished requests or commands for that IOM routine from all of the other IOM routines and reconstructs each data block, parity block or metadata block in response, so as to insure that any updates to new blocks of data or new blocks of parity are atomic.

The data/parity update process is atomic because updates to the data block and an associated parity block in a parity group happen together or not at all. When a new data block and parity block are stored in the array storage system by the distributed file system, the new data block and new parity block are each stored by a different storage node. The current address of the data block and parity block for a parity group are not changed in the metadata stored by each storage node in the parity group and the old data block and old parity block are not discarded until it has been confirmed that both the new data block and the new parity block are safely written to disk by the storage nodes for both the data block and the parity block. If an unscheduled stop occurs during the middle of a data/parity update process, journals of all of the transactions between the input/output managers maintained by each storage node involved in the data/parity update process are evaluated to determine the extent to which the data/parity update was completed. If the new data and/or parity is confirmed as accurate and available, either on disk or in the buffers of one of the input/output managers, then the recovery process will complete the data/parity update and update the current address of the data block and parity block. If neither the new data or parity is confirmed as accurate and available, then the recovery process will keep the current address for the data block and parity block at the addresses of the old data block and old parity block.

In a preferred embodiment, the distributed file system utilizes a distributed metadata arrangement in which each storage node maintains its portion of the meta-data and the distributed file system handles requests on a file-oriented basis, instead of block-oriented basis. The file-oriented distributed file system relies on an object-oriented RAID approach where a memory translator for the file system translates requests from clients and keeps track of where blocks are logically located within a file. An input/output manager for each storage node maps the logical blocks to their corresponding physically location in that node's storage system. Preferably, each storage node also keeps its own journal of transactions between that node and all other nodes relating to data/parity updates, thereby providing for an inherent redundancy in the journaling of data/parity updates that can recover from the failure of any one of the storage nodes, including one of the two storage nodes involved in a data/parity update process.

In one embodiment, a computer-implemented method of storing data objects in an array storage system provides for atomic data/parity updates of data objects. The data objects include at least one parity group having a number N of data blocks and a parity block computed from the N data blocks. The data objects are stored in the array storage system under software control of a distributed file system having at least a number N+1 of input/output manager (IOM) routines. Each IOM routine controls access to a unique portion of the storage system. When a write request to store a new block of data for a data object is received by a first IOM, the first IOM issues an update parity request to a second IOM associated with a parity block for the new block of data. The first IOM then issues a write command to write the new block of data to the array storage system and waits to receive a write command complete from the array storage system for the new block of data. The second IOM receives the update parity request from the first IOM and compute a new block of parity for the parity group that includes the new block of data. The second IOM then issues a write command to write the new block of parity and waits to receive a write command complete from the array storage system for the new block of parity. Each of the first and second IOM's maintain a journal of all requests and commands received and issued among the IOM's. In the event of an unscheduled stop of the array storage system, the data parity group of the data object is recovered by reviewing the journal entries for both the first and second IOM and reconstructing the data block or the parity block in response if necessary. Preferably, each IOM makes a journal entry that corresponds to each of the following: a write data command from a requester, an update parity request from another IOM, a write data command complete from the array storage system, a write parity command issued in response to the update parity request from another IOM, a write parity command complete from the array storage system, and an update parity request complete from another IOM.

In another embodiment, the data parity group is provided with a proxy capability that allows the data parity group to continue operating in a reduced capacity in the event of a failure of one of the storage nodes in the data parity group. In this embodiment, read and write requests directed to the failed storage node are handled by another storage node that has been designated as the proxy or secondary for the failed storage node. The proxy storage node recovers the requested data by regenerating the data using the data from all of the other storage nodes in the data parity group together with the parity data. If the request is a read request, the proxy storage node simply regenerates the requested data from the data and parity on other nodes and returns the requested data. If the request is a write request, the proxy storage node uses the regenerated data to determine the update to the parity block corresponding to the new data block that is to be written. Although the new data block cannot actually be written because the failed storage node on which it should be written is unavailable, the proxy storage node directs the parity storage node to update and write the parity block. The proxy storage node also modifies the metadata for the failed storage node by modifying the parity block for the metadata for the failed storage node in a similar manner. When the failed storage node is once again available, the IOM routine reconstructs the metadata using the parity blocks associated with the metadata. The IOM routine then evaluates this metadata to determine which of the data blocks on that storage node need to be reconstructed because they were modified during the period of time when the failed storage node was unavailable. Each data block that is to be reconstructed is now rebuilt by the IOM routine for the now recovered storage node. The IOM routine regenerates the data block from the data blocks on the other storage nodes and the parity block that was modified by the proxy storage node to reflect the changes made to that data block.

In this embodiment, each of the storage node IOMs and the parity storage node IOM (other than a proxy IOM) maintain a journal of all requests and commands received and issued among each other. In the event of an unscheduled stop of the array storage system, the data parity group of the data object is recovered by reviewing the journal entries for all of the IOMs and reconstructing the data/parity block in response if necessary. When a storage node IOM fails, each of the other IOMs uses its journal processing to identify any data/parity updates that were in process between that IOM and the failed IOM. All of the other IOMs communicate with the proxy IOM for the failed IOM which of the data/parity blocks were in process of being updated. That proxy IOM then marks the metadata for those data/parity blocks in the failed IOM that will need to be reconstructed once the failed IOM is restarted or replaced.

BRIEF DESCRIPTION OF THE DRAWINGS

FIG. 15 shows a flowchart of a preferred embodiment of the atomic data/parity update process of the present invention.

DETAILED DESCRIPTION OF THE PREFERRED EMBODIMENT

The preferred embodiment of the present invention will be described with respect to a distributed file system having distributed metadata as described in more detail in the co-pending applications entitled "Computer Storage System," Ser. No. 09/261,708 and "Self-Healing Computer Storage System", Ser. No. 09/439,440, both of which are assigned to the assignee of the present invention and the disclosure of each of which is hereby incorporated by reference. The present invention is equally applicable to a distributed file system having centralized metadata as described, for example, in U.S. Pat. Nos. 5,960,446 and 6,032,216. Following a description of the preferred embodiment of the distributed file system and array storage system as shown in FIGS. 3–9, the preferred embodiment of the proxy arrangement of the present invention will be described with reference to FIGS. 10–14 and the preferred embodiment of the atomic data/parity update arrangement of the present invention will be described with reference to FIGS. 1–2 and FIGS. 15–16.

Figure 3:
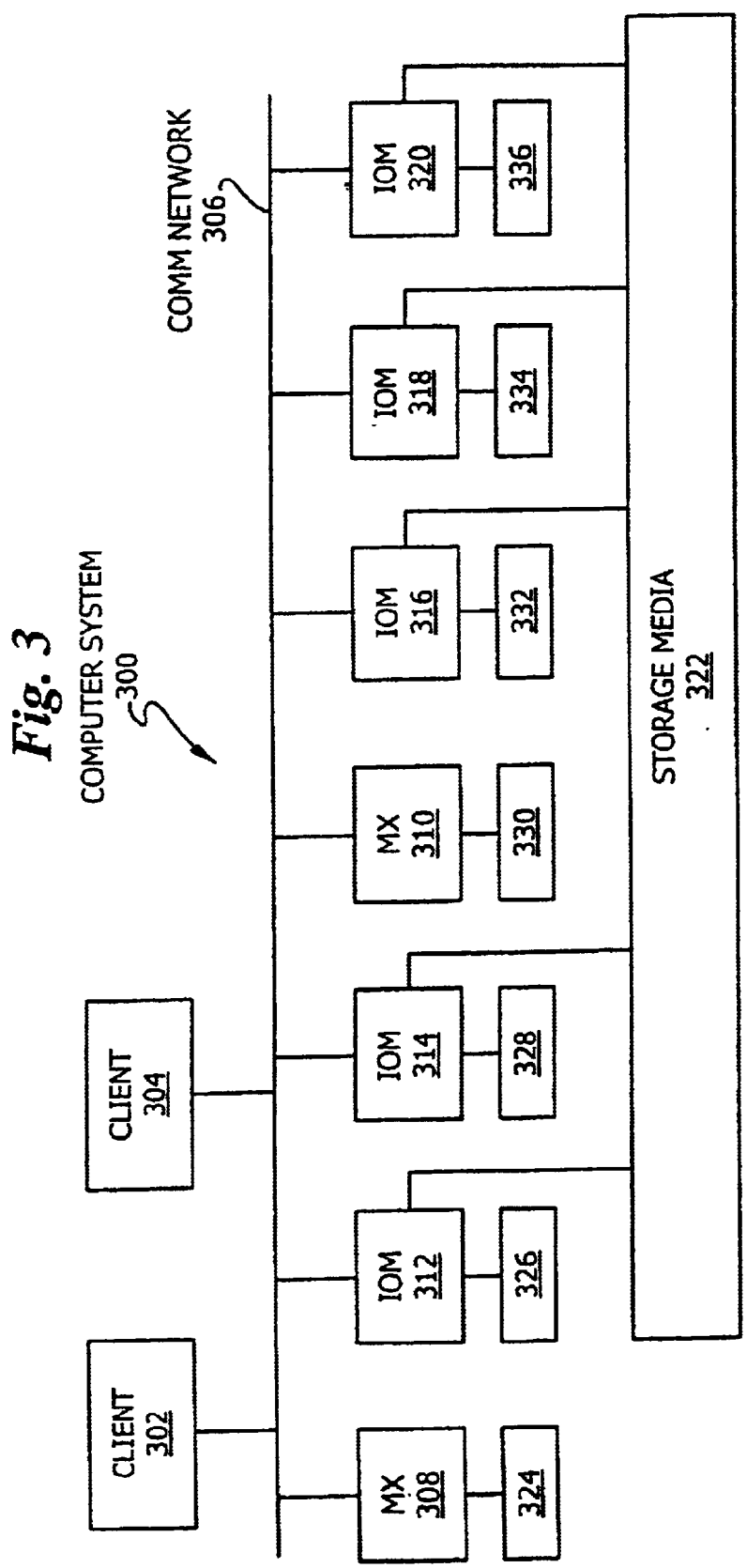
FIG. 3 shows a computer system having distributed system storage in accordance with one embodiment of the invention.

A computer system having distributed storage in accordance with one embodiment of the invention is shown in FIG. 3. As indicated, computer system 300 includes clients 302 and 304, communication network 306, memory translators (MXs) 308 and 310, input-output managers (IOMs) 312, 314, 316, 318, and 320, and store media 322. In addition, each MX 308 and 310 and each IOM 312 through 320 has an associated data store, 324 through 336.

Clients 302 and 304 generate/initiate memory access transactions such as object create, object read, object write, and object delete operations. The term "object," as used herein, refers to any entity which may be assigned and accessed by a memory label (e.g., a filename, directory name or volume name). One illustrative object is a file object which may be defined as of a sequential array of records. Another illustrative object is a directory object which may be defined as of an ordered collection of records. In one embodiment, a directory may be a B-tree of records, the collection of all such records representing a global directory which may be physically stored on one or more storage devices. In one embodiment, a system directory (organized as a single file) is redundantly distributed across multiple storage devices. While the size of a record may be variable, a data file record is typically one byte (i.e., byte addressable) and a directory record is typically the size needed to store that information associated with a directory node (e.g., 1000 to 4000 bytes). Communication network 306 serves to interconnect the various system components. Illustrative communication networks may use any available protocol (e.g., the transport control protocol) and may be implemented using any suitable technology such as copper wire, infrared, fiber optic, microwave, or satellite communication technologies. Storage media 322 may include one or more storage devices such as, for example, magnetic disks (fixed, floppy, and removable), magnetic tape media and optical media such as CD-ROM disks.

Memory translators provide, among other things, two capabilities. First, each MX translates memory access commands between a client protocol, such as that used by an NFS® or Windows® based client, and a format that may be processed by one or more input-output managers. In this sense, a MX represents a client's point of access to system memory space embodied in storage media 322. In one embodiment, there may be as many MXs as there are types of client file systems. Second, each MX may obtain and/or retain an object's referential map. A referential map describes the association between an object and those input-output mangers at which at least a portion of the object is stored. Thus, input-output mangers represent logical storage units over which an object is distributed. (An object's master or primary referential map is maintained as part of the object's metadata which is accessed, possibly indirectly, through its directory entry.) In one embodiment, a MX may retain an object's referential map (to the extent possible in data storage 324 or 330, for example) if it performed a lookup operation on the object's label for a client (i.e., a filename-to-handle translation). In another embodiment, only that MX associated with an input-output manager storing an object's initial portion (e.g., an object's "start of file") retains the object's referential map.

In general, referential maps may be generated in accordance with any desired mapping function. In one embodiment, the referential mapping function may rely on the sequential identification of input-output managers in a striping fashion. Referential mapping information of this type may include: (1) identification of that input-output manager at which the object's first record is stored; (2) the number of input-output managers over which the object is distributed, referred to as the object's span; (3) indication of the lowest numbered input-output manager at which any portion of the object is stored; and (4) the quantum (e.g., number of bytes) of the object stored at each input-output manager. In another embodiment, the referential mapping function may be an explicit identification of those input-output managers at which at least an explicitly identified portion of an object is stored. Referential mapping information of this type may include: (i) identification of each input-output manager on which at least a portion of an object is stored; and (2) the quantum of the object stored at each of the identified input-output managers.

Figure 4:
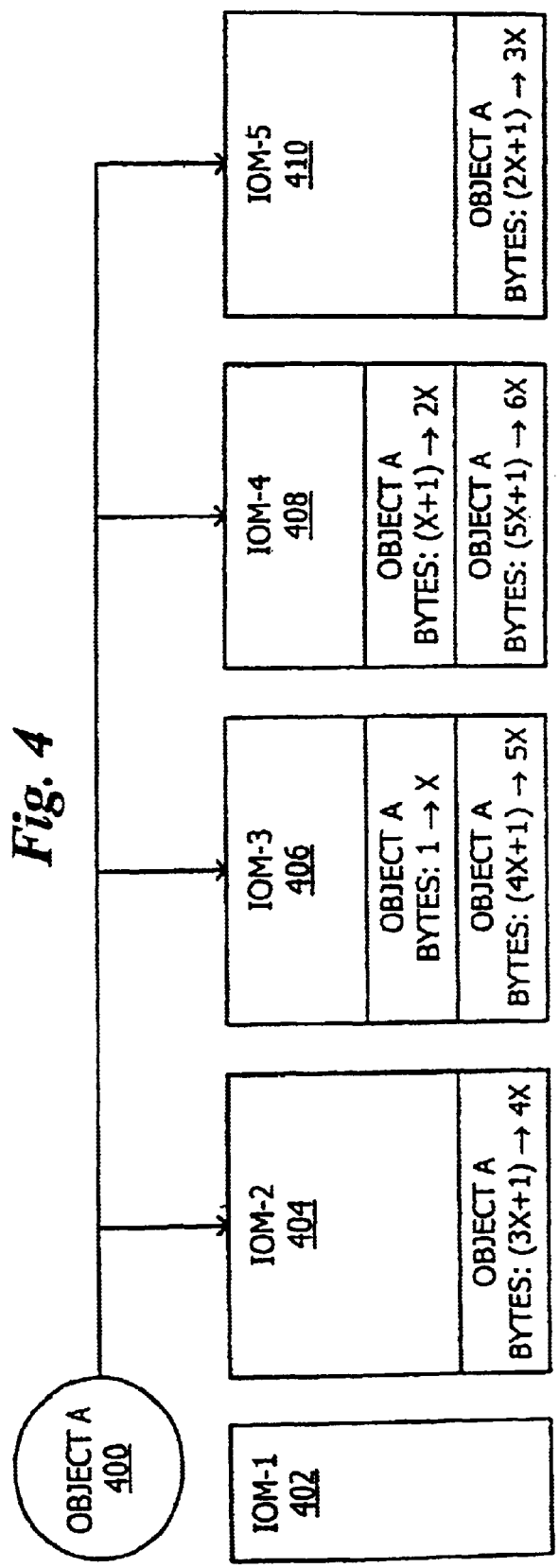
FIG. 4 shows a referential mapping of an object in accordance with one embodiment of the invention.

FIG. 4 illustrates the first technique in which object A 400 (being 6×bytes in length) is striped across four of a system's five input-output managers (IOM-2 404 through IOM-5 410) in quantum's of X bytes, beginning at IOM-3 404. In this example, object A's starter input-output manager is IOM-3 406; object A's span is 4; the lowest numbered input-output manager at which at least a portion of object A 400 is stored is IOM-2 404; and object A 400 is stored in quanta of X bytes. (Note; object A does not need to be an even multiple of X.)

It is significant to note that referential maps do not incorporate information specifying an object's physical storage location. That is, a MX does not have knowledge of or access to information describing how and where any portion of an object is physically stored. In contrast, prior art distributed file system command protocol translators generate and maintain mappings between an object's label (e.g., filename), the associated object reference (e.g., handle), and the physical storage locations allocated to the object. Because of this linkage between an object and its physical storage location at the file command translator level, prior art file systems do not distribute an object across a plurality of processors (that is, physical memory managed by two or more processes executing on two or more processors).

Figure 5:
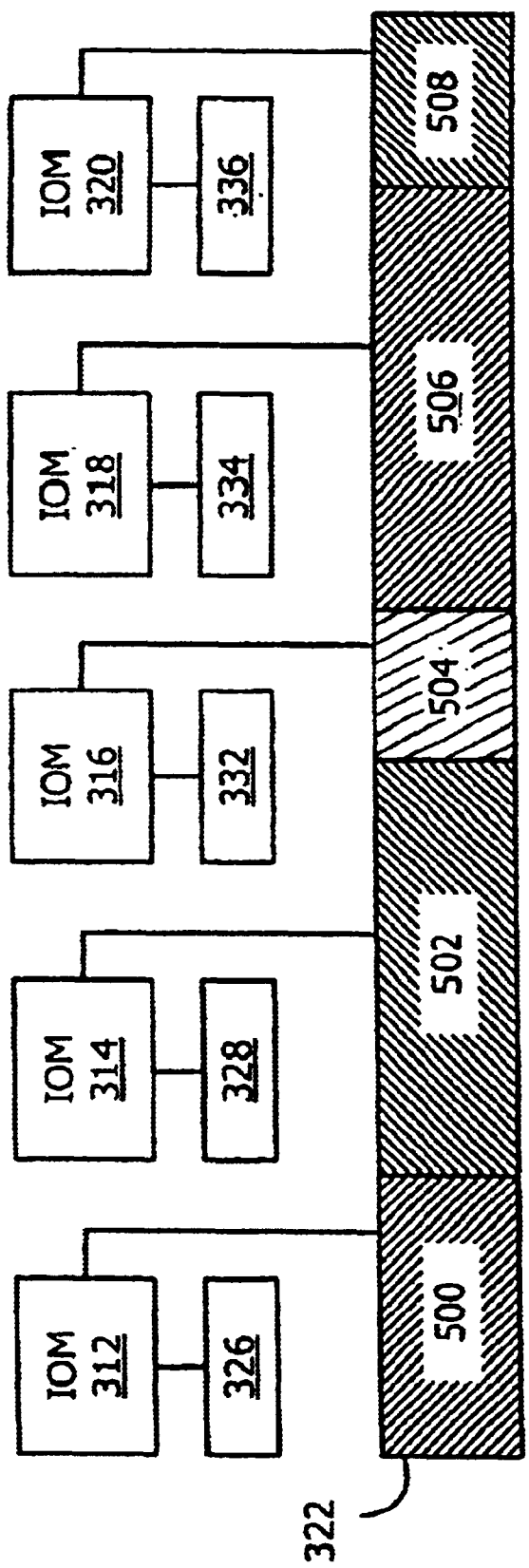
FIG. 5 shows how input-output managers may be mapped to various portions of system storage media in accordance with one embodiment of the invention.

Input-output managers manage a specified portion of system memory embodied in storage media 322. Referring to FIG. 5 for example, IOM 312 may manage memory space 500, IOM 314 may manage memory space 502, and so forth. Each of memory spaces 500 through 508 may span one or more physical storage devices, portions of one or more physical storage devices, or any combination thereof. As additional memory (i.e., storage devices) is added to computer system 300, the new memory may be managed by one or more existing IOMs, one or more additional (new) IOMs, or any combination of new and existing IOMs.

More specifically, IOMs manage the storage of portions of objects to physical memory. To this end, each IOM generates and maintains physical maps. A physical map describes the association between at least a portion of an object managed by an IOM and the physical memory allocated to those object portions by the IOM. In addition, if an IOM manages the physical storage of only a portion of an object, the IOM may generate and maintain information identifying those IOMs which manage the object's other portions. This latter information may be used by IOMs to facilitate the storage, retrieval, and manipulation of objects distributed across multiple IOMs. It is significant that an IOM generates and maintains physical maps for only those portions of objects for which it manages physical storage.

Partitioning an object's storage access information into independent referential and physical maps in accordance with the invention provides many significant benefits. One benefit is that referential maps may be generated at object creation time and thereafter left unchanged. The unchanging nature of referential maps makes them an ideal type of Information to globally distribute (e.g., to all clients). Another benefit of separating storage access information into referential maps and physical maps allows the details of an object's physical storage (i.e., its location) to be completely disassociated from the object's addressability via its label or handle. This, in turn, may provide clients with a unified view of system namespace; clients may access an object through a constant and consistent reference without the need (or ability) to know where or how an object is physically stored. Yet another benefit of separate referential and physical maps in accordance with the invention is that each IOM maintains only those physical maps for those portions of objects for which it manages physical memory because different IOMs may be associated with—or executed by—different processors, separation of storage access information into referential maps and physical maps provides a mechanism to distribute objects across multiple processors. The ability to distribute objects across multiple processors, In turn, may contribute significantly to the expandability of a distributed storage system in accordance with the invention. Distribution of objects across multiple processors also allows each portion of an object to be accessed independently of any other portion of an object.

The independence between different portions of a stored object also allows the use of a stand-in storage access manager (e.g., a proxy IOM) to compensate, at runtime, for a failed storage access manager. This, in turn, provides a computer storage system in accordance with one embodiment of the invention with a self-healing capability as discussed more fully below.

Figure 6:
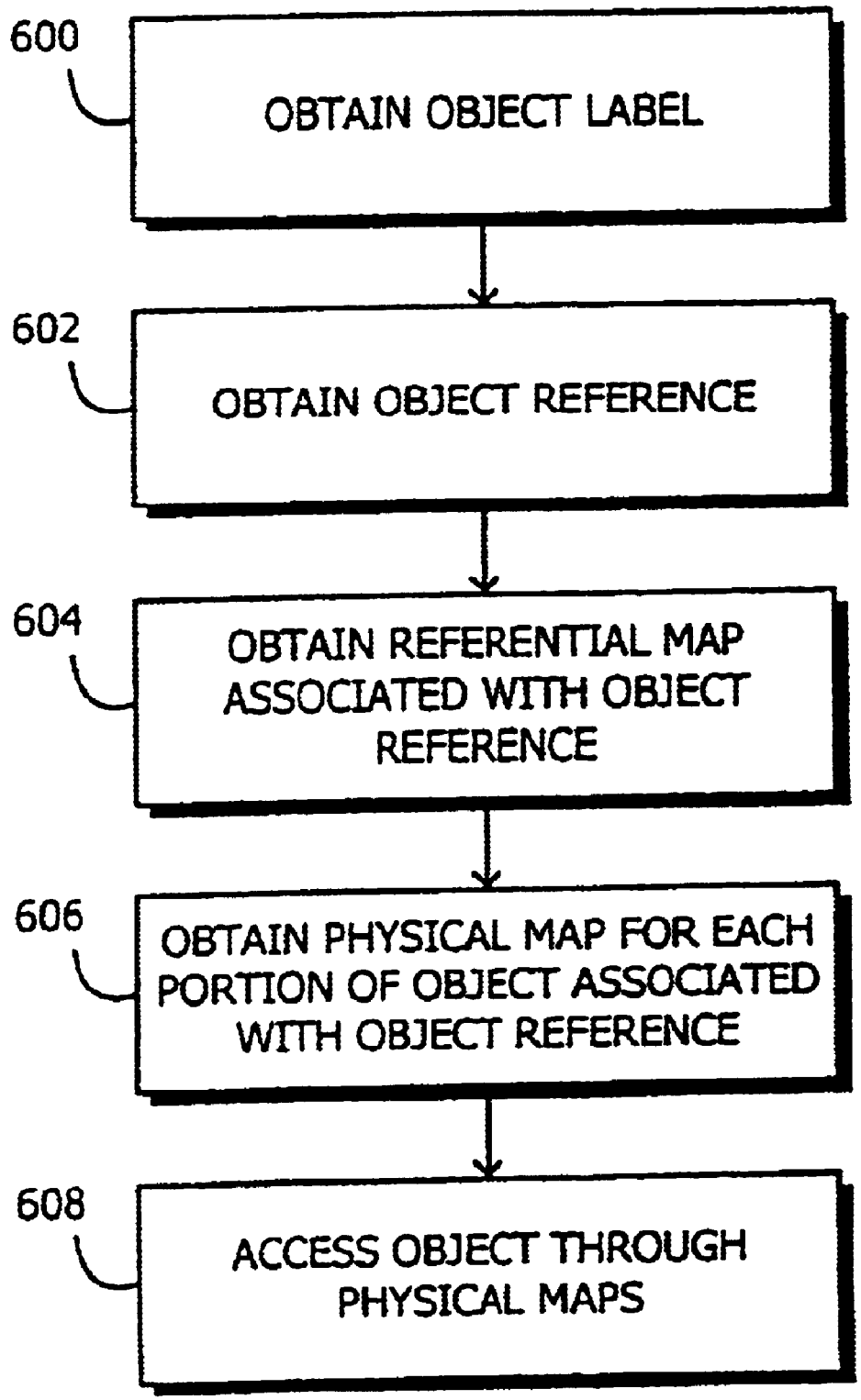
FIG. 6 shows a memory access method in accordance with one embodiment of the invention.

A method to access an object using referential and physical maps in accordance with one embodiment of the invention is illustrated in FIG. 6. Initially an object's label or filename is obtained (block 600) and translated to an object reference or handle in any convenient manner (block 602). (Label to reference translation is often referred to as a "lookup" operation). Having obtained an object's handle, the object's referential map is obtained (block 604). An object's referential map may generally be one element of that object's directory entry so that a directory lookup on an object's handle retrieves that object's referential map. As characterized above, a referential map describes how an object is distributed to one or more IOMs, where each of the one or more IOMs is responsible for managing the physical storage for a part of the object. No information regarding the physical storage characteristics of an object is included in a referential map.

Having identified those IOMs associated with an object, the physical maps for each of the objects distributed portions may be obtained (block 606). Specifically, one or more physical maps may be obtained from each of the IOMs identified in the object's referential map. Access to each portion of an object is then provided by an IOM in accordance with the physical map associated with that IOM (block 608).

It will be recognized that less than an entire object may be accessed. For example, the nth 32 kilobyte block of an object may be accessed by: identifying one or more IOMs responsible for the physical storage of the nth 32 kilobyte block (via the referential map obtained during the acts of block 604); retrieving the relevant physical maps; and accessing physical memory in accordance with those physical maps.

Figure 7A:
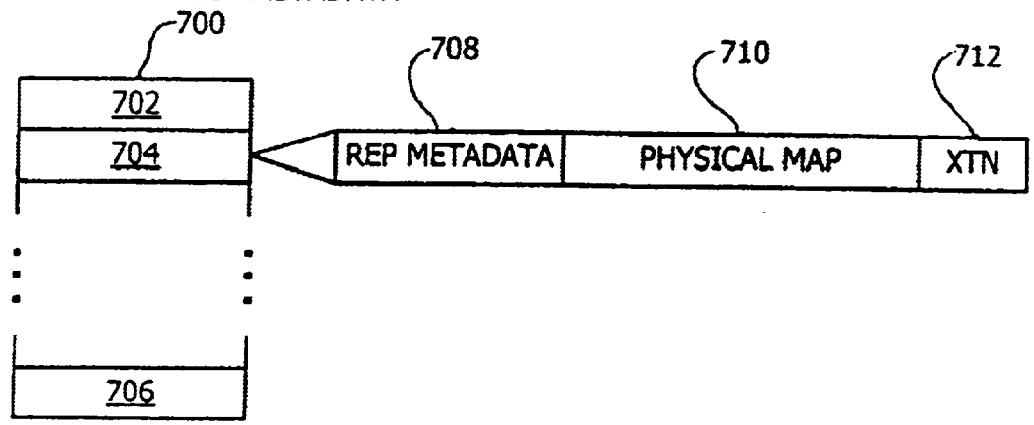
FIGS. 7A, 7B, and 7C illustrate object metadata structures that an input-output manager may use to identify an object's physical map in accordance with one embodiment of the invention.
Figure 7B:
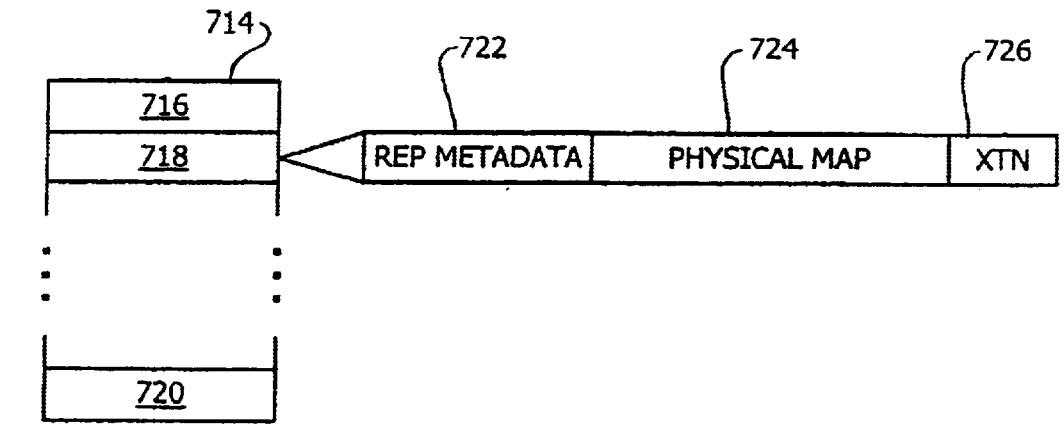

One mechanism by which an IOM may translate an object's reference to a physical map uses a handle that provides an indication of the object's starter IOM and an index into the starter IOM's primary object metadata. An object's starter IOM is that IOM at which the objects initial portion (e.g., an object's "start of file") is stored. For example, if object A is distributed across IOMs 1 through 5, and the first quantum of object A is physically located in memory allocated and controlled/managed by IOM-3, then IOM-3 is said to be object A's starter IOM. An IOM's primary object metadata associates an object's handle with a physical map. An IOM maintains primary object metadata for only those objects (or portions of objects) stored in memory allocated to and managed by the IOM. Each IOM also maintains secondary object metadata for those objects (or portions of objects) stored in memory allocated to and managed by the IOM but for which it is not the starter IOM. Primary and secondary metadata may be retained in data stores associated with each IOM (e.g., component 326 in FIG. 3) which may include volatile and/or non-volatile memory. In one embodiment, each IOM maintains primary and secondary object metadata in table form as shown In FIGS. 7A and 7B.

Each IOM's primary object metadata table 700 includes one entry (e.g., 702, 704, and 706) for each object for which it is the starter IOM. Typically, each entry in primary metadata table 700 is a fixed size, and includes replicated metadata field 708, physical map field 710, and extension field 712. Replicated metadata field 708 includes a copy of an object's referential map information. Physical map field 710 associates one or more physical storage block on a storage device with that portion of the object associated with primary metadata object table entry 704. Thus, each physical map may itself include multiple entries. Extension field 712 indicates if an object's physical map exceeds a length allowed by the size of physical map field 710. For example, extension field 712 may be assigned a null or zero value if all of an object's physical storage (managed by an IOM) may be indicated within the space allocated to physical map field 710. If, however, an object's physical map requires more storage block indications than may be included in fixed size physical map entry 710, extension field 712 may indicate a file in which the object's physical map is continued.

Each IOM's secondary object metadata table 714 includes one entry (e.g. 716, 718, and 720) for each object for which it manages physical memory associated with the object (or part thereof) and for which it is not the starter IOM. Each entry in secondary object metadata table 714 includes the same information as doe an entry in the primary metadata table 700: replicated metadata field 722; physical map field 724; and extension field 726.

Figure 7C:
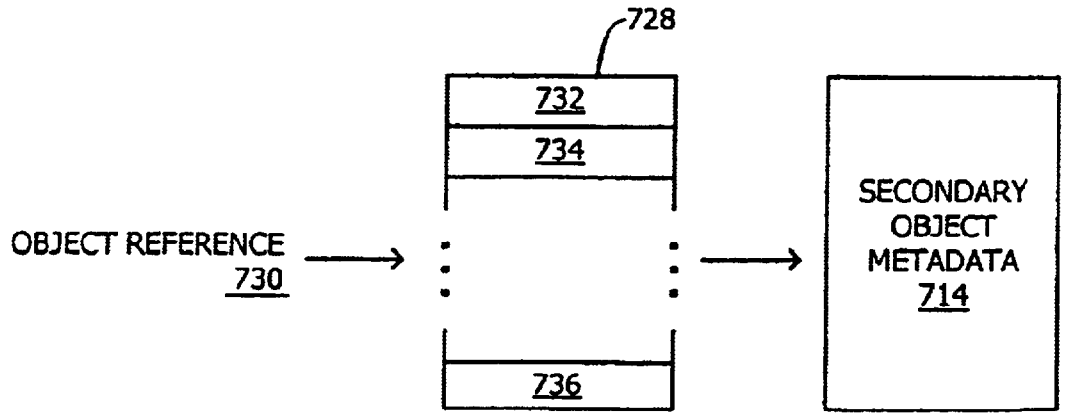

Referring to FIG. 7C, each IOM also maintains a secondary object hash structure 728 to facilitate object reference to secondary object metadata table lookup. As noted above, an object's unique reference or handle provides an indication of the object's starter IOM and index into the starter IOM's primary object metadata 700. Thus, if an IOM is not an object's starter IOM, the object's reference 730 provides no direct indication of where the object's physical map is located. By hashing on object reference 730, a unique entry in secondary object hash structure 728 may be determined (e.g., 732, 734, and 736) which, in turn, identifies a unique entry and physical map in secondary object metadata 714. In one embodiment secondary hash structure 728 may be implemented as a B-tree. In another embodiment, secondary hash structure 728 may be implemented as a link-list structure. In yet another embodiment, secondary hash structure 728 may be implemented as a dynamically resizable array.

Figure 8:
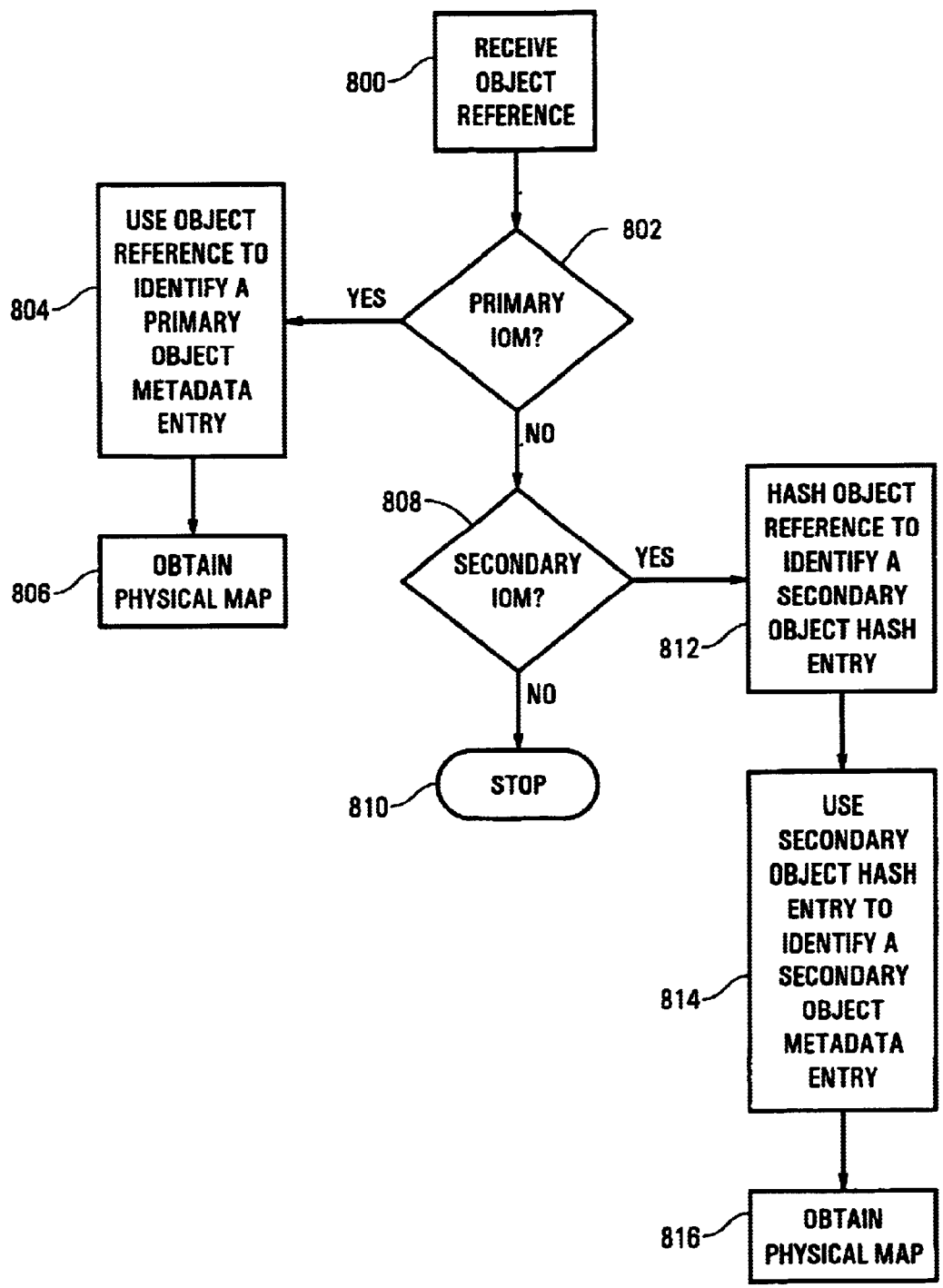
FIG. 8 illustrates a method in accordance with one embodiment of the invention by which an input-output manager identifies a physical map using the metadata structures of FIGS. 7A, 7B and 7C.

A technique in accordance with one embodiment of the invention by which an IOM identifies a physical map using the metadata structures of FIGS. 7A, 78 and 7C is shown in FIG. 8. First, the IOM receives an object reference or handle (block 800). If the IOM is the object's primary IOM (the "yes" prong of diamond 802), the object reference is used to directly identify an entry in the IOM's primary object metadata (block 804). The relevant physical map may then be obtained from the identified metadata entry (block 806). If the IOM is not the object's primary IOM (the "no" prong of diamond 802), and the IOM is not a secondary IOM for the object (the "no" prong of diamond 808), processing may stop as the IOM has no information regarding the object (block 810). If the IOM is a secondary IOM for the object (the "yes" prong of diamond 808), the object reference is hashed to identify a secondary object hash entry (block 812). Based on the identified secondary object hash entry, an entry in the secondary object metadata is identified (block 814). The relevant physical map may then be obtained from the identified metadata entry (block 816).

Figure 9:
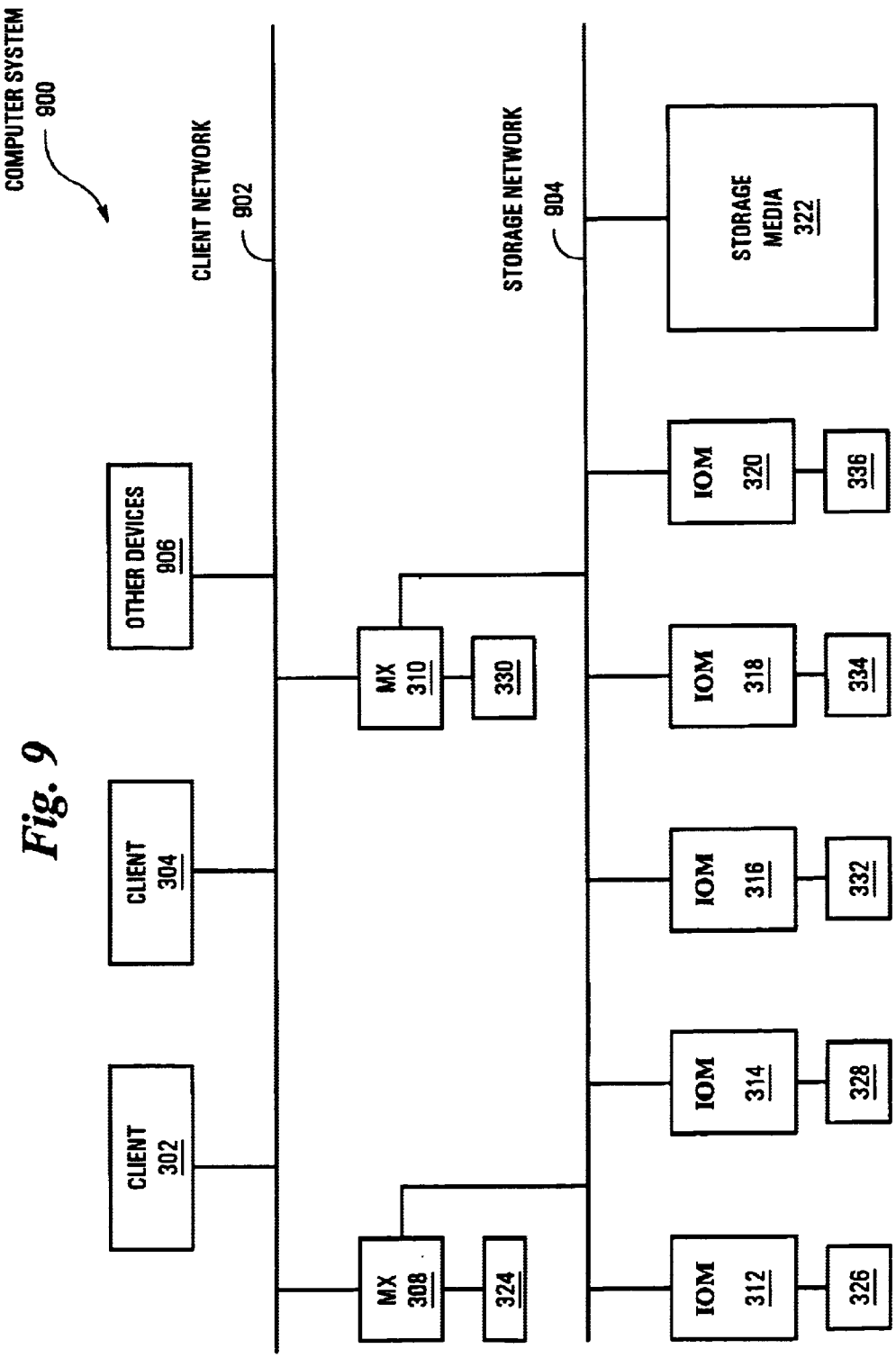
FIG. 9 shows an alternative embodiment for a computer system having distributed system storage.

It will be recognized that a computer system to provide distributed system storage in accordance with the invention may be implemented via architectures different from that shown in FIG. 3. For example, FIG. 9 shows an alternative computer system 900 that employs two networks: client communication network 902 and storage communication network 904. In this embodiment, client data traffic is segregated from storage system data traffic. That is, each client may communicate with another client, a MX, or another device 906 (e.g., a printer device) without interrupting or being interrupted by data transfer operations between one or more IOMs. It will be further recognized that each of client network 902 and storage network 904 may include one or more physical networks and may, furthermore, be implemented using any desired technology. In addition, the implementation of client network 902 and storage network 904 may be independent of one another.

Typically, MX and/or IOMs are embodied in one or more program modules or routines for execution by a programmable control device. Illustrative storage devices suitable for tangibly embodying MX and/or IOM program modules include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Illustrative programmable control devices include a single computer processor, a plurality of computer processors coupled by one or more communication links, or a custom designed state machine. Custom designed state machines may be embodied in a hardware device such as a printed circuit board comprising discrete logic, integrated circuits, specially designed application specific integrated circuits (ASICs), or field programmable gate arrays.

Figure 10:
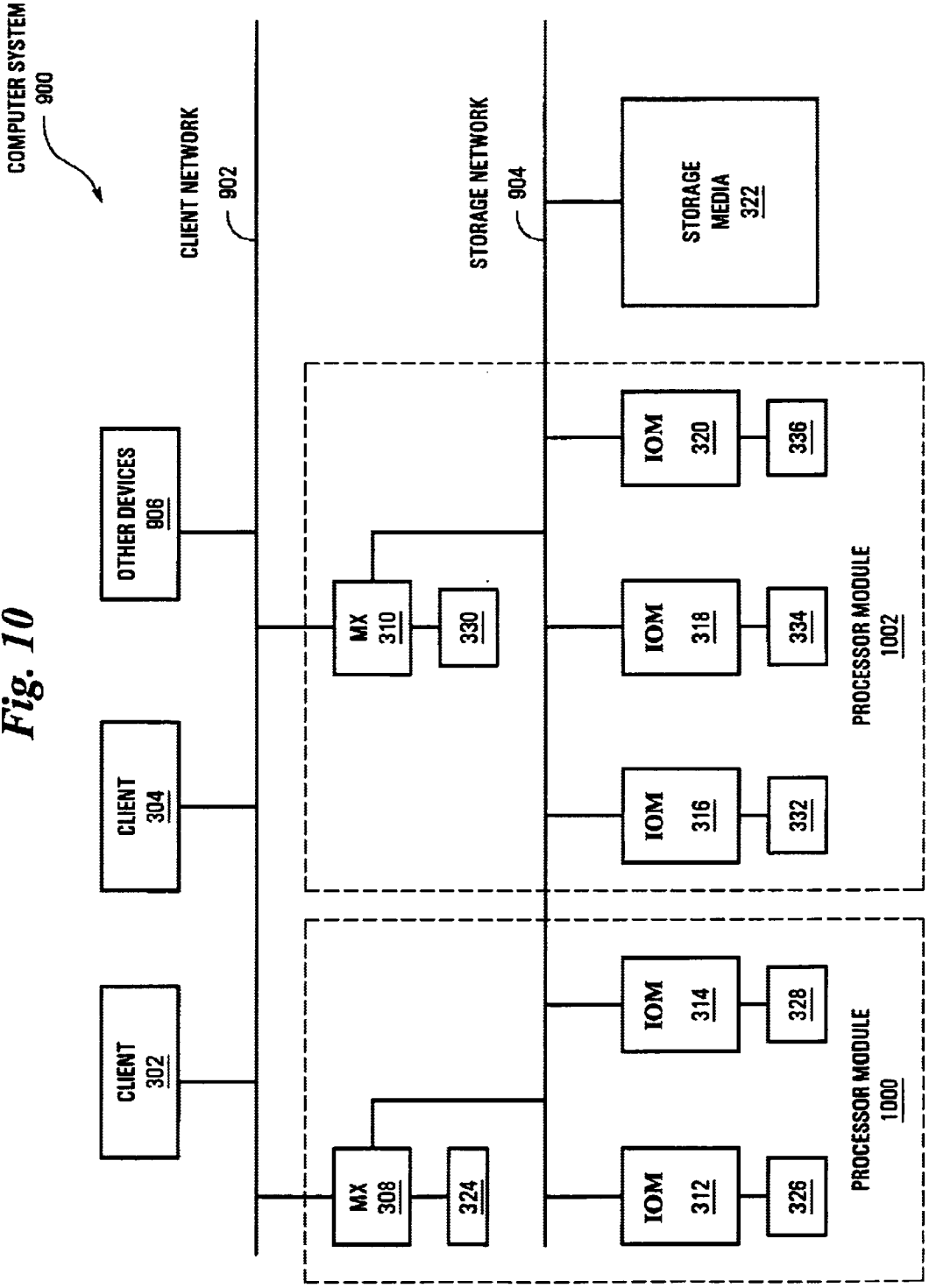
FIG. 10 shows a hardware partitioning of the computer system of FIG. 9 in accordance with one embodiment of the invention.

Referring to FIG. 10, the computer system of FIG. 9 is shown as including, processor modules 1000 and 1002 as well as client devices 302, 304, other devices 904, and storage media 322. Each of processor modules 1000 and 1002 includes at least one programmable control device which is designed to execute MX and IOM routines. In a similar manner, each client 302 and 304 may be an independent computer system such as, for example, special or general purpose workstations including multiprocessing systems.

As described herein, MX and IOM objects act independently from and without reliance on resources associated with other MX or IOM objects. Process independence and distributed storage enables a system in accordance with one embodiment of the invention to compensate for a failed MX and/or IOM through the use of proxy objects. For example (see FIG. 3), if IOM 316 is the designated proxy for IOM 312 and IOM 312 fails, IOM 316 may service those client requests directed to a stored object (or part thereof) managed by failed IOM 312 provided the necessary metadata and fault tolerance data (e.g., parity information) associated with IOM 312's data is available to proxy IOM 316. To facilitate the operational recovery of IOM 312, proxy IOM 316 modifies the data fault tolerance and metadata fault tolerance objects (e.g., files) associated with changes to the stored object which, before failure, would have been managed by IOM 312. An indication that the stored object's fault tolerance information has been modified is provided to IOM 312 when it is restarted, thereby allowing it to reconstruct those parts of the stored objects data and metadata which it manages so as to reflect the modifications made by its proxy IOM 316. Accordingly, distributed computer system storage in accordance with one embodiment of the invention provides storage management software that is self-repairing or self-healing in the face of software and/or hardware failures.

Figure 11:
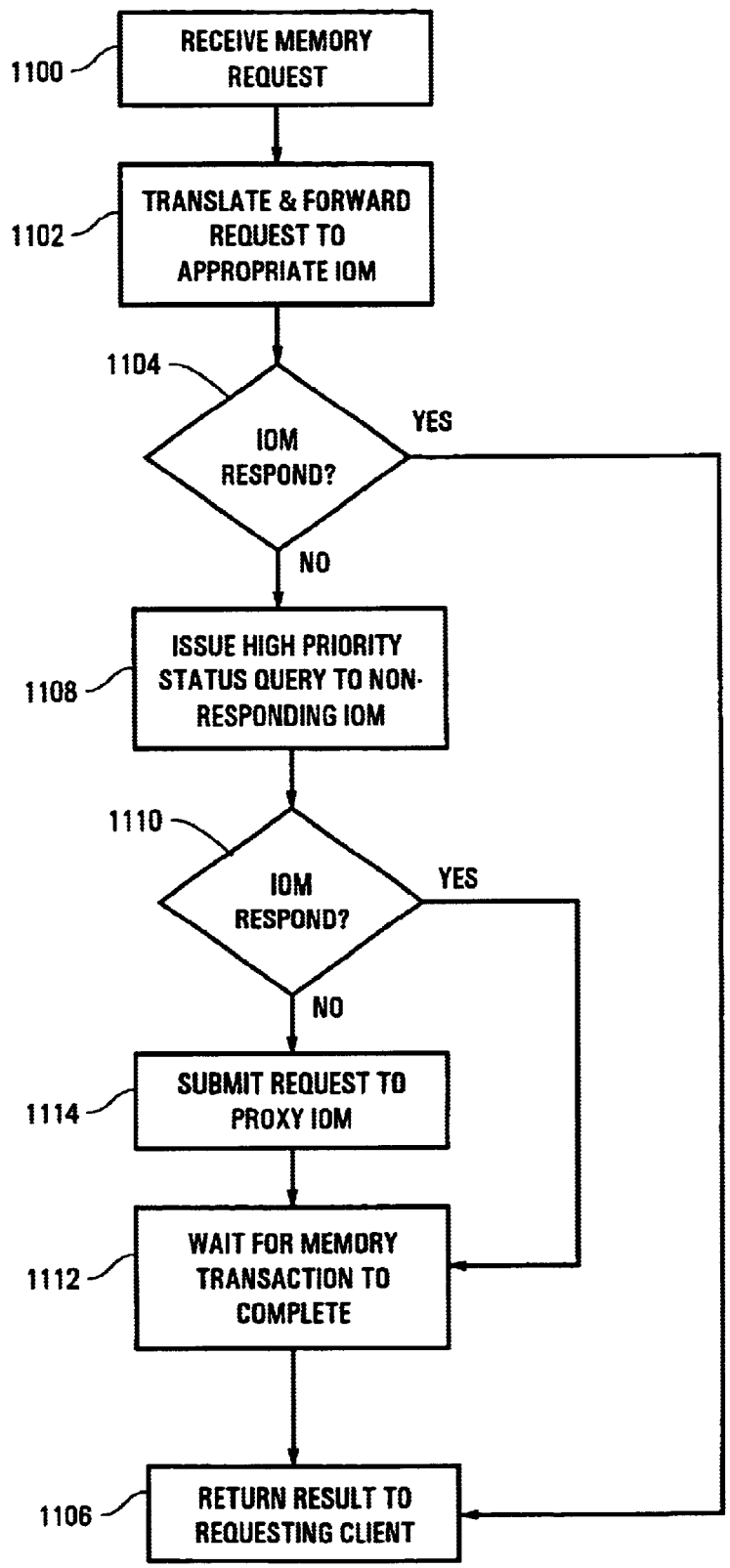
FIG. 11 shows a flowchart of how a memory translator initiates use of a proxy input-output manager in accordance with one embodiment of the invention.

Referring to FIG. 11, a flowchart of how a MX processes a memory transaction request in accordance with one embodiment of the invention is shown. A client-initiated memory transaction request directed to a stored object is received (block 1100) and forwarded to the one or more appropriate IOMs as described above (block 1102). If the targeted IOM responds (the "yes" prong of diamond 1104), the response is passed back to the requesting client (block 1106). If the target IOM does not respond within a specified time period (the "no" prong of diamond 1104), the MX may issue a high priority status query (e.g., a "ping" signal) to the non-responding IOM (block 1108). If the IOM responds to this second query (the "yes" prong of diamond 1110), the MX waits for the IOM to complete the memory request (block 1112), forwarding the response to the client when it is received (block 1106). If the targeted IOM fails to respond to the MX's second query within a specified time period (the "no" prong of diamond 1110), the MX assumes the targeted IOM has failed. In another embodiment, the MX may initiate multiple queries to a non-responsive IOM at block 1108 before proceeding with the acts of block 1114. In yet another embodiment, each IOM may issue periodic "heartbeat" signals to indicate to one or more MXs that they are operational; the lack of such a heartbeat signal for a specified period of time indicating the IOM has failed. In general, the combination of acts illustrated by blocks 1104, 1108 and 1110 are designed to distinguish between the case where an IOM is operational but slow to respond, and when it has failed. Thus, if an IOM is operational but slow to respond to a submitted memory access request, a MX may simply wait for the response. If an IOM fails to respond to either the access request or subsequent health status queries within a specified time period (to the access request, to one or more health status requests, or by failure to generate a heartbeat signal, for example), the IOM may be deemed failed. The time period used to distinguish between a slow responding and failed IOM is an operational parameter established by the designer. For example, health status or heartbeat signals may be sent or expected every 100 to 1,000 milliseconds; an IOM failing to respond or transmit the same for a continuous period of 1 to 4 seconds may be deemed to have failed.

Once an IOM is determined to have failed (the "no" prong of diamond 1110), the MX determines which IOM is the appropriate proxy, and submits the memory request to that IOM (block 1114). While many methodologies are possible, in one embodiment proxy IOM assignment relies on the sequential identification of input-output managers. For example, if IOMs 312 through 320 in FIG. 3 are identified as IOMs 1 through 5, respectively, then IOM-1's proxy may be IOM-2, IOM-2's proxy may be IOM-3, IOM-3's proxy may be IOM-4, IOM-4's proxy may be IOM-5, and IOM-5's proxy may be IOM-1. To further improve the ability of proxy IOM's to compensate for run-time failures, IOM proxy assignment may alternate, to the extent possible, across processor modules. Referring again to FIG. 10 for example, if IOM 312 is assigned the identifier 1, IOM 314 is temporarily skipped because it executes on the same processor module (module 1000) as does IOM 312. Instead, IOM 316 may be assigned the identifier 2, with the next assignment alternating back to processor module 1000. In this manner IOM 314 maybe assigned the identifier 3, IOM 318 the identifier 4, and IOM 320 the identifier. Thus, if any one IOM fails (due to a software or hardware failure) there is a secondary or proxy IOM that is available to process the failed IOM's requests, provided those requests can be satisfied using metadata and fault tolerance data associated with the failed IOM and available to the proxy IOM (see discussion below regarding FIG. 12).

In a preferred embodiment, proxy IOM 316 is implemented by having code in proxy IOM 316 that initiates another IOM routine on the controller or process module for proxy IOM 316 when it has been determined that IOM 312 has failed. This newly initiated IOM routine preferably has the same setup and access information as IOM 312 and will be the software code that actually responds to the client's memory requests as the proxy IOM 316. Alternatively, this software code could be incorporated as a subroutine or part of proxy IOM 316. Following submission of the client's memory request to a proxy IOM (block 1114), the MX waits for the memory transaction to complete (block 1112), forwarding the result to the requesting client when received (block 1106).

In a preferred embodiment, once it has been determined that IOM 312 has failed, the MX or IOM that identifies the failure publishes a notification to at least all other IOMs by sending a message, setting a flag or any other form of communication. Each IOM receiving this notification checks to see if it has been designated as the proxy IOM for the failed IOM. If so, that IOM initiates another IOM routines on its controller or process module as just described. If not, that IOM evaluates is journal to determine if there are any unfinished requests or commands between that IOM and the failed IOM. If there are unfinished requests or commands with the failed IOM, that IOM publishes those unfinished requests or commands so that the newly initiated IOM on the controller for the proxy IOM can then respond to those unfinished requests or commands.

Figure 12:
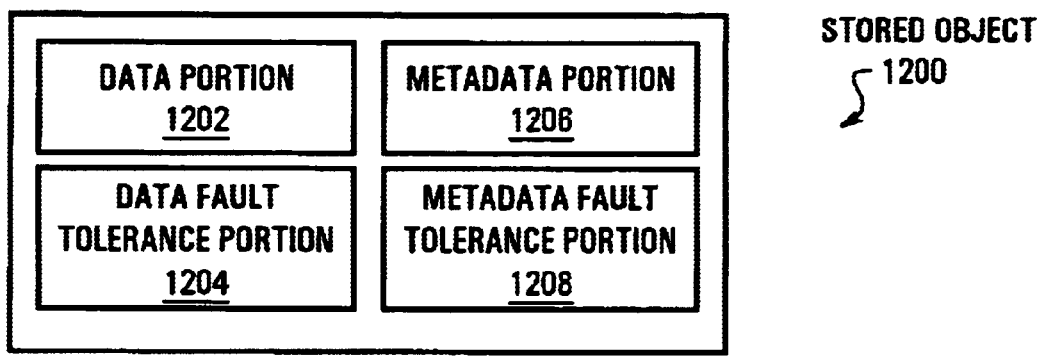
FIG. 12 shows that a stored object may comprise data metadata and fault tolerance information portions.

As described herein, information related to a stored object may be divided into three parts or portions: a data portion; a metadata portion; and fault tolerance portions. The data portion represents the information content of the object, the text and formatting information within a word processing file for instance. The metadata portion includes the object's access information such as the stored object's physical map (or a part thereof), the level of fault tolerance assigned to the object, object length or size, time and date modification tags, and the like. The fault tolerance portions represent object protection information and may be associated with either or both of the data portion and the metadata portion. Referring to FIG. 12, for example, the composition of arbitrary stored object 1200 includes data portion 1202, data fault tolerance portion 1204, metadata portion 1206 and metadata fault tolerance portion 1208. As with data 1202 and metadata 1206 portions, data fault tolerance 1204 and metadata fault tolerance 1208 portions may be distributed across one or more IOMs. It will be recognized that not every stored object is required to have associated fault tolerance information. For example, a user or system administrator may choose not to protect some objects (e.g., text files, images, and database files). If an object has a fault tolerance portion, it is typically distributed to IOMs different from that which manage the related data and metadata portions. That is, if part of data 1202 and metadata 1206 portions are managed by IOM 314 (see FIG. 3 or 10), those parts of data fault tolerance 1204 and metadata fault tolerance 1208 portions associated with data and metadata managed by IOM 314 are distributed to a different IOM. In one embodiment, the "different" IOM is IOM 314's designated proxy. In another embodiment, the "different" IOM is yet another IOM accessible by IOM 314's designated proxy. Illustrative fault tolerance information include RAID (redundant arrays of independent disks) technology level 1 (disk mirroring), level 3 (parity saved to a dedicated disk), or level 5 (parity data dispersed with object data) information. The ability of a proxy IOM to service requests issued to a failed IOM depends, in part, on the level of protection afforded to a stored object's data and metadata.

In addition to maintaining stored objects, each IOM has an associated contents object and a contents parity object. A contents object includes the information (metadata) needed to access all of the metadata (and, therefore, the data) managed by the IOM. The contents parity object includes fault tolerance information that will allow the reconstruction of the contents object should the contents object become corrupt or unavailable. As with other stored objects, the contents parity object is typically stored and managed by IOMs other than that to which the contents object is associated. (In one embodiment, for example, contents parity objects are mirrored.) Each IOM generally knows where its contents parity object is stored (i.e., at what IOM) so that it may be retrieved and used during IOM startup operations (see discussion below). Further, each IOM generally knows where the contents parity object of the IOM for which it is a designated proxy is stored so that it maybe retrieved and used during failed IOM operations (see discussion below).

It will be recognized by those of ordinary skill in the art of computer file system design, that the use of proxies can be applied equally to memory translator (MX) processes. For example, each MX process (e.g., 308 and 310 in FIGS. 3, 9 and 10) may have a designated proxy MX. In one embodiment, each MX process may be assigned a numeric label on creation (similar to an IOM), wherein the next consecutive MX is a designated proxy. In another embodiment, a MX process may signal a designated MX that it is sending a file system command to one or more IOM's. On completion of the memory transaction the initiating MX could send a "transaction complete" message to its proxy MX. If at any time a MX that initiates a memory transaction fails to send a "transaction complete" message to its proxy MX within a specified time period, the proxy MX may assume the originating MX has failed and follow the procedure outlined in FIG. 11.

Figure 13A:
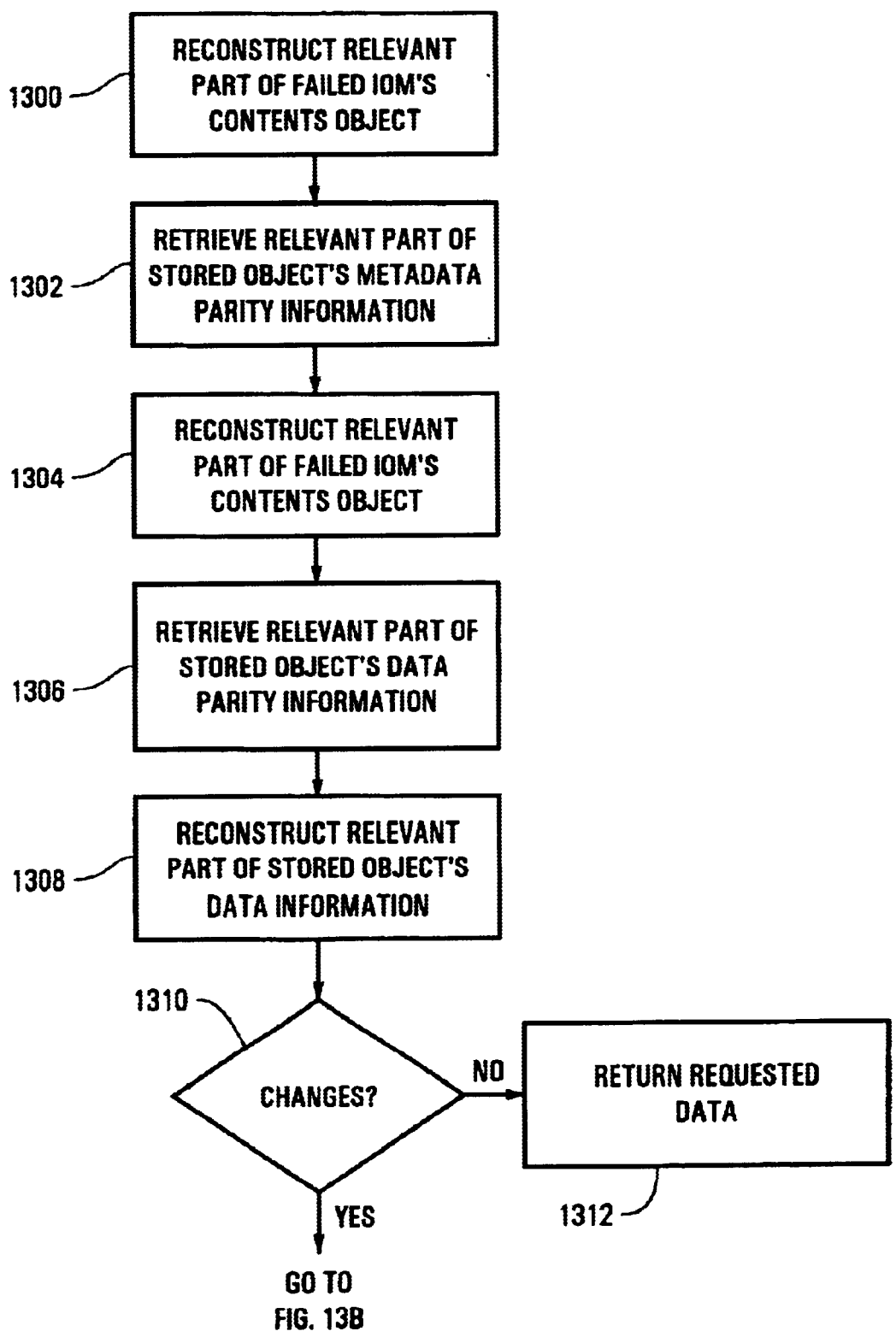
FIGS. 13A and 13B show a flowchart of how a proxy input-output manager processes a memory transaction request received in accordance with FIG. 11.
Figure 13B:
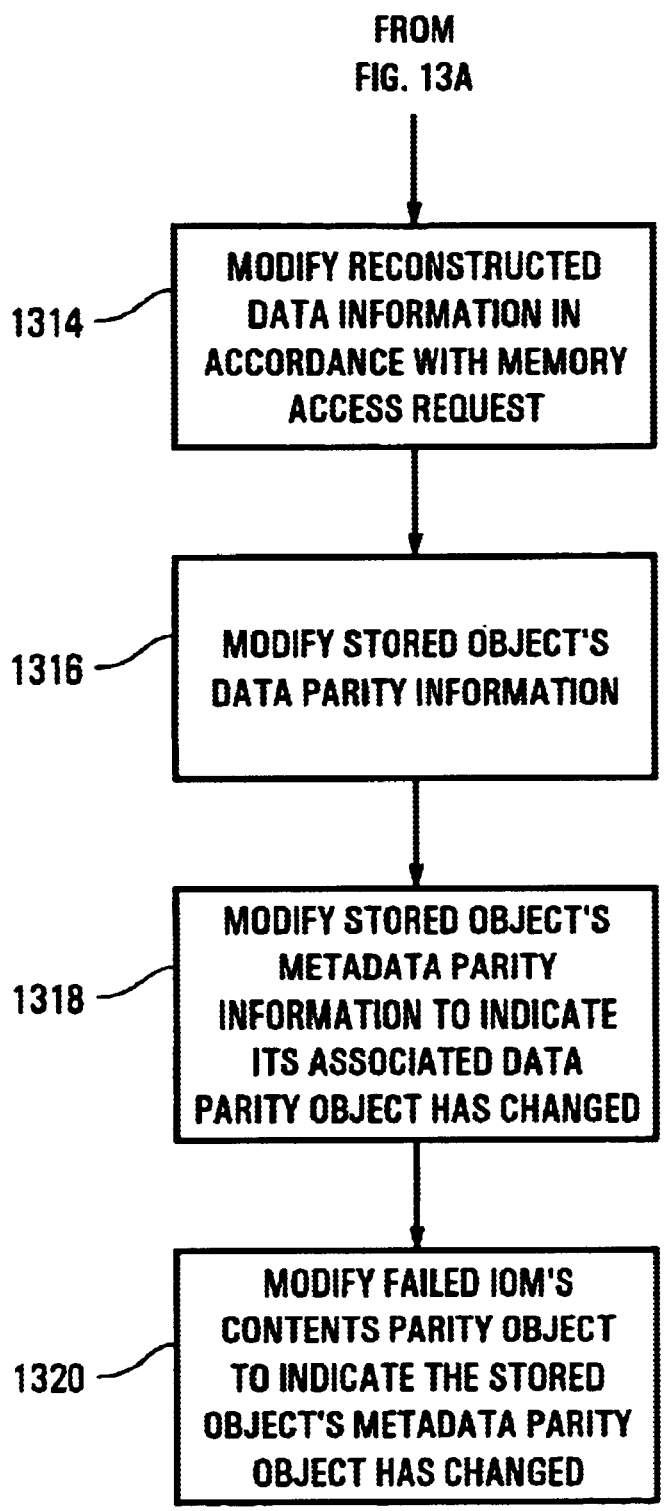

Referring to FIGS. 13A and 13B, an illustrative flowchart of how a proxy IOM processes the memory transaction request received in accordance with block 1114 of FIG. 11 is shown. Initially, the proxy IOM reconstructs the relevant part of the failed IOM's contents object by retrieving and using the relevant part(s) of the failed IOM's contents parity object (block 1300). From the reconstructed contents information, the relevant part of the stored object's metadata parity portion is retrieved (block 1302) and the corresponding part of the metadata information is reconstructed (block 1304). From the reconstructed metadata information, the relevant part of the stored object's data parity portion is retrieved (block 1306) and the corresponding part of the stored object's data is reconstructed (block 1308).

If the requested memory transaction does not require a change to the stored object's data (the "no" prong of diamond 1310), the proxy IOM returns the requested data to the user via, for example, the appropriate MX (block 1312). If the requested memory transaction requires a change to the stored object's data (the "yes" prong of diamond 1310), the proxy IOM makes the changes to the reconstructed data information (block 1314) and also modifies the stored object's data parity portion to reflect the changes (block 1316). It will be recognized that changes to the stored object's data parity portion typically occur as a result of "store" operation on the reconstructed data information. It will also be recognized that the stored object's data parity portion may or may not be managed by the proxy IOM.

In addition to modifying the stored object's data parity portion, the proxy IOM causes the stored object's metadata parity portion to be modified to indicate that the stored object's data parity portion has been modified (block 1318). In one embodiment, this may be accomplished by setting a value (e.g., a flag) in the reconstructed metadata information and then causing this change to be pushed into the stored object's metadata parity portion by a "save" operation. Following, or concurrent with, setting a value in the stored object's metadata parity portion, the proxy IOM sets a value in the failed IOM's contents parity object to indicate the stored object's metadata parity portion has been modified (block 1320). As with the metadata parity portion, this may be accomplished by setting a value (e.g., a flag) in the reconstructed contents information and then causing this change to be pushed into the failed object's contents parity object by a "save" operation. Acts in accordance with FIGS. 13A and 13B are repeated as needed to respond to a memory transaction request. In one embodiment, the value set in the stored object's metadata parity portion comprises a variable or flag field associated with the stored object's physical map. For example, a "modified" flag associated with element 710 of FIG. 7A or element 724 in FIG. 7B. Changes may be indicated by a first value (e.g., non-zero), while no changes are indicated by a second value (e.g., zero). Similarly, the failed IOM's contents parity object may have a modification indicator field associated with the metadata entry for the specific stored object that was modified.

In this embodiment, each of the IOMs maintains a journal of all requests and commands received and issued for that IOM. The proxy IOM preferably does not maintain a journal of requests and commanded received and issued for the IOM that is the target of the proxy IOM. The details of the manner in which these journals are maintained are described in detail with reference to FIGS. 1 and 2 below. In the event of an unscheduled stop of the array storage system, the journal entries for all of the IOMs are reviewed to determine whether any pending data or parity update operations for a stored object's data portion, parity portion or content portion were successfully completed by all of the IOMs involved.

Figure 14:
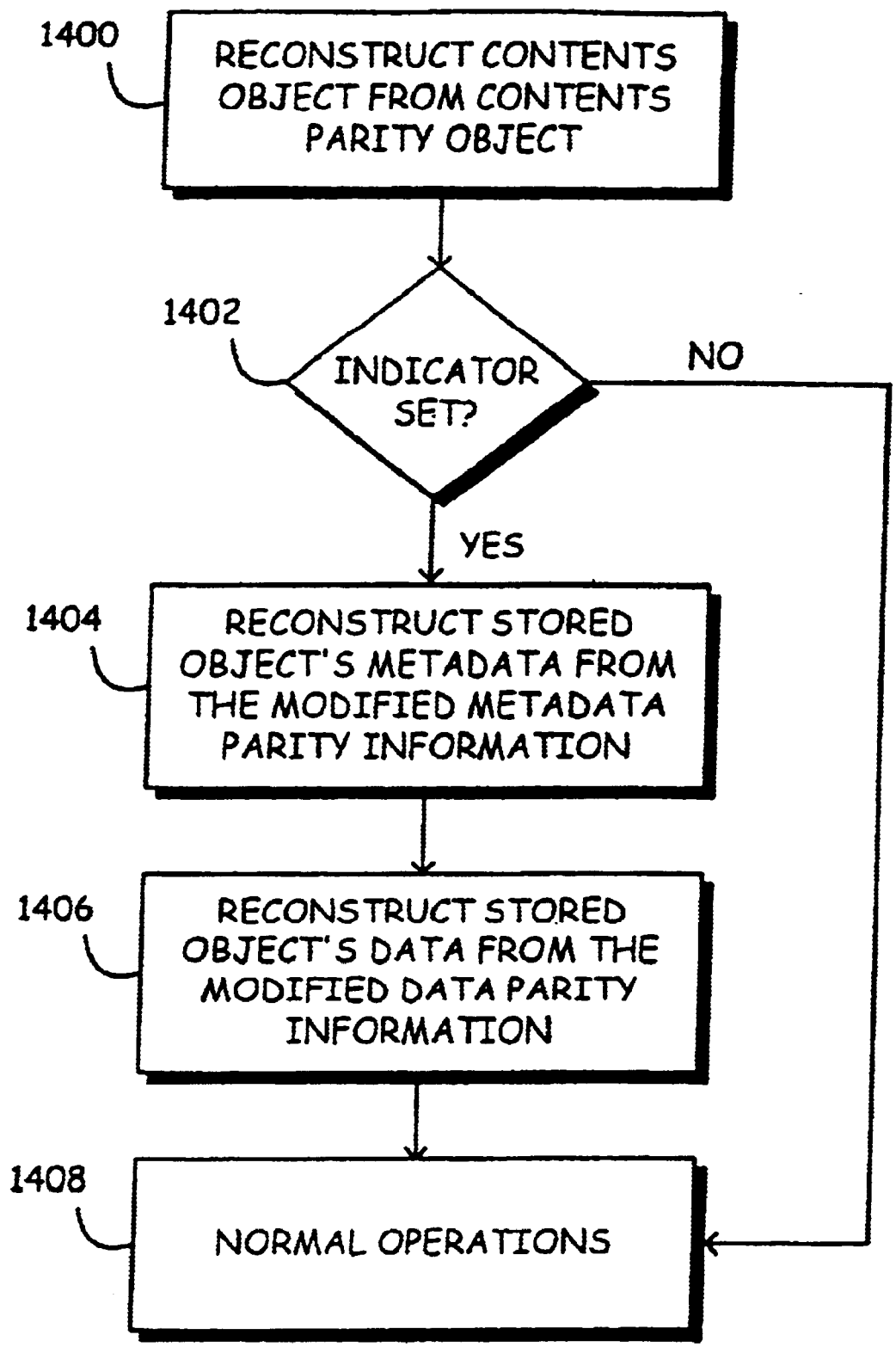
FIG. 14 shows a restart procedure for a previously failed input-output manager in accordance with one embodiment of the invention.

Referring now, to FIG. 14, an IOM restart procedure making use of the indications set in accordance with FIG. 13 is shown. On start-up (e.g., a restart operation), the previously failed IOM reconstructs its contents object from the contents object's parity object (block 1400). If the contents object does not contain a value indicating a stored object's metadata parity portion has been modified (the "no" prong of diamond 1402), the restarting IOM begins normal operations (block 1408). If the contents object contains a value indicating a stored object's metadata parity portion has been modified (the "yes" prong of diamond 1402), the stored object's metadata is reconstructed from the object's modified metadata parity portion (block 1404). Next, the stored object's data is reconstructed from the object's modified data parity portion (block 1406). With the stored object's reconstructed metadata and data portions now reflecting the changes made by the proxy IOM, normal operations may resume (block 1408). It is significant to note that the restarted IOM reconstructs only those parts of the stored object which it manages (recall, each IOM may only have knowledge of and access to a part of a stored object).

In addition at each point where a metadata portion (block 1404) or data portion (block 1406) is reconstructed, the journal logs for the restarted IOM and the parity IOM are evaluated during the reconstruction process to determine whether any pending updates to data and/or parity were successfully completed by all IOMs in accordance with the atomic data/parity update arrangement as will be described. If the updates were not successful, then the process of reconstructing either the metadata portion or data portion further includes the steps as will be described with reference to FIGS. 16A–16D to determine how best to recover from an update that was not fully completed.

Figure 1:
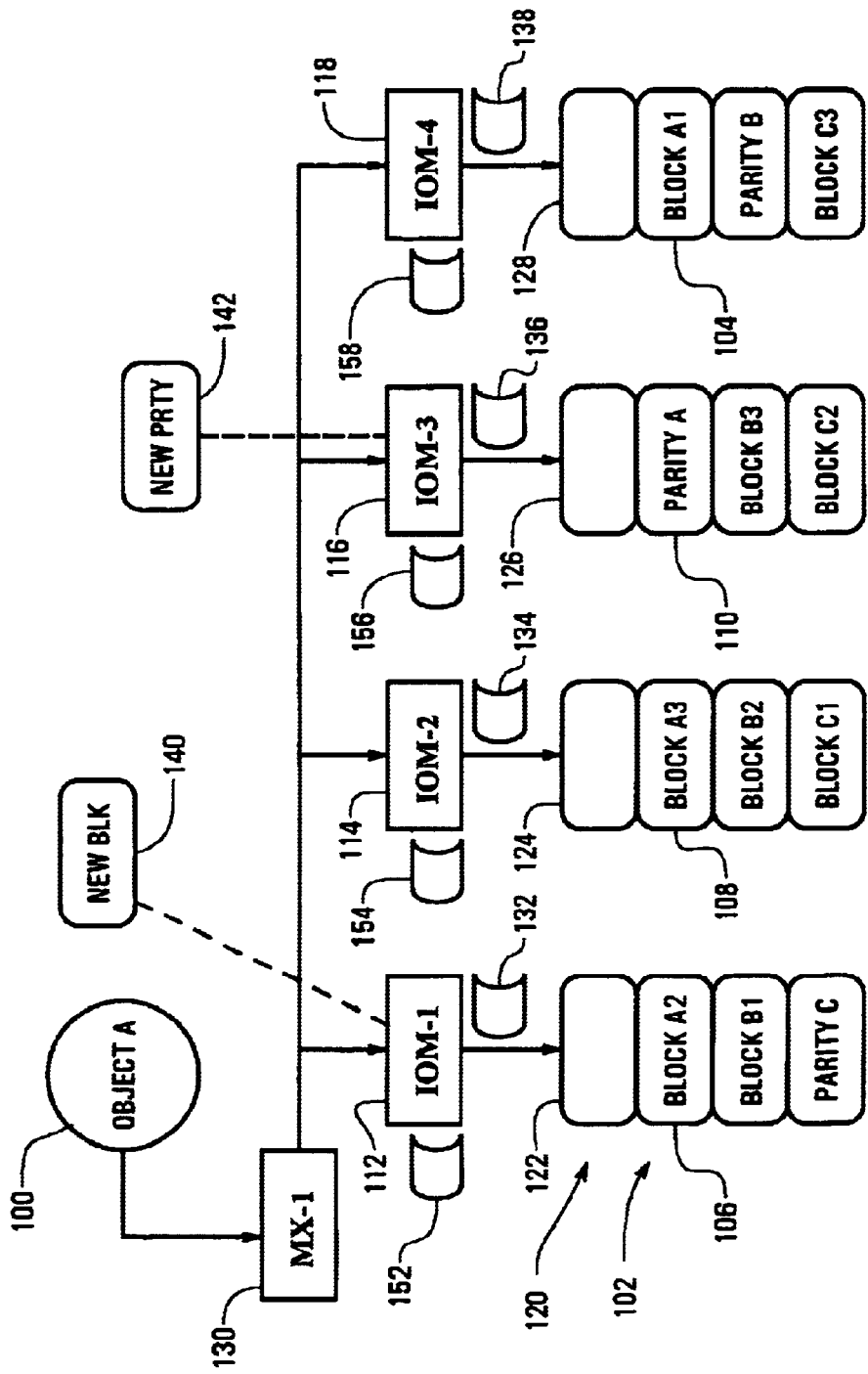
FIG. 1 shows an overview of a computer system having an atomic data/parity update arrangement in accordance with the preferred embodiment of the present invention.

Referring now to FIG. 1, a preferred embodiment of the atomic data/parity update arrangement of the present invention will now be described. A data object 100 includes at least one parity group 102 having a number N of data blocks 104, 106 and 108 and a parity block 110 computed from the N data blocks 106. The number of parity groups 102 that comprise a data object 100 will depend upon the size of the data object 100, the size of a data block 104, 106 and 108, and the number N of data blocks per parity group 102. The data objects are stored in the array storage system under software control of a distributed file system as previously described having at least a number N+1 of input/output manager (IOM) routines 112, 114, 116 and 118. Each IOM routine controls access to a unique portion of the memory space 122, 124, 126 and 128 of the array storage system 120. In the preferred embodiment as has been described, the data object 100 is distributed to the various IOM's 112, 114, 116 and 118 by the memory translator 130 and each IOM has its own metadata store 132, 134, 136 and 138. In this example, N=3 and each parity group 102 is striped across four IOM's. It will be recognized that for a different IOM's although this may not be the case for other embodiments.

When a write request is received by the first IOM 112 to store a new block of data 140 that will replace or update an existing data block 106, the first IOM 112 issues an update parity request to a second IOM 116 associated with the parity block 110 corresponding to the block of data 106, 140 that is being changed (in this example—parity group A). The first IOM 112 then issues a write command to write the new block of data 140 to the storage system 122 and waits to receive a write command complete from the storage system 122 for the new block of data 140. The second IOM 116 receives the update parity request from the first IOM 112 and computes a new block of parity 142 for the parity group 102 that includes the block of data 106, 140 that is being changed. The second IOM 116 then issues a write command to write the new block of parity 142 and waits to receive a write command complete from the storage system 126 for the new block of parity 132. Each of the IOM's 112, 114, 116 and 118 maintains a Parity_Update journal 152, 154, 156 and 158, respectively, of all requests and commands received and issued among the IOM's. In the event of an unscheduled stop of the array storage system, the data parity group 102 of the data object 100 is recovered by reviewing the journal entries 150, 156 for both the first IOM 110 and the second IOM 116 and reconstructing the data block 140 or the parity block 142 in response if necessary.

Parity updates in the present invention must be able to be done atomically with the corresponding data updates when maintenance of data integrity after a system crash is required. The Parity_Update journals 150, 152, 154 and 156 keep track of the progress of the parity update in a distributed manner. Because the contents of each Parity_Update journal 150, 152, 154 and 156 are moved to disk or other nonvolatile storage such as NVRAM associated with each IOM 110, 112, 114 and 116, examining all of these journal at the time of recovery insures that the data and parity updates will either both occur or neither will occur in the event of a single disk failure. This is because at least one journal 150, 152, 154 and 156 will have a record of a data/parity update having been started, even if the disk/IOM which crashed was one of the two involved in the data/parity update. Based on how far the update was in the process of being completed and hardened to disk, it may be possible to complete the data/parity update; but if not, then the address pointers in the metadata for both the data and parity IOMs will both be set to the old data and the old parity.

In designing the preferred embodiment of the present invention, the following requirements for the atomic data/ parity update process have been used. An update of parity and data should be atomic even if one of the two IOMs (data or parity) goes down in the middle of the update process. Disk space allocations and deallocations preferably are included in the journal to make these operations reliable independently from FSCK and atomic with the data and parity writes. Replies to the caller should be sent without waiting for any disk IO to complete unless "write-through" is specifically indicated for the file. If "write-through" is specifically indicated for the file or if the operating system permits a user to specify "write-through" for an individual write request and that specification is passed through to MX or IOM, the reply should indicate that the write can be guaranteed to be found on disk. The design should "roll forward" whenever possible after the first entry to the Parity_Update journal is on disk. The number of disk accesses required for any data and associated parity update should be a minimum. For example, neither data update nor the parity update should be written to disk more than once (e.g., both to the Parity_Update journal and to the data file or parity file on disk). For partial writes and partial parity updates, a second cache buffer (requiring a new disk address only if it would be required for a full buffer update) must be used. If subsequent writes do not fill in the rest of the data or parity, that data or parity needed for the rest of the chunk must be filled in from the old data or old parity buffer. Parity_Update journal entries should be sized such that no Parity_Update journal entry spans a 1024-byte boundary in the Parity_Update journal (to guarantee that writes of entries in the Parity_Update journal are atomic).

In the preferred embodiment, the flexibility of the system is maximized by providing a global variable available to each IOM that specifies whether the Parity_Update journal will be flushed from buffer cache to some form of NVRAM even if there has been a power outage, or whether the Parity_Update journal must use the disk as its NVRAM without assuming power protection.

These requirements result in several fundamental principles in the implementation of the preferred embodiment of the present invention. A data update is made in a different area of disk from that used for the previous data update if the computation of its parity update requires knowledge of that previous data state (e.g., if the data is not "new", is RAID5 protected and is not mirrored). When knowledge of the previous state is required, "readahead" should be used to have that state in the buffer cache as often as possible before it is needed. Partial writes should be supported if it is possible to avoid read-before-write of data. Partial parity updates should be supported if it is possible to avoid read-before-write of parity data.

Preferably, the requirement for this kinds atomicity is selectable based by a user or administrator based on the nature of the data object being stored as indicated by a "toughness" parameter as will be described in further detail. The "toughness" parameter is a user selectable parameter that allows a user to choose the balance between speed and reliability for data objects stored by the distributed file system of the present invention. When a buffer update is done on a buffer with a "toughness" of greater than zero, the new data 140 and new parity 142 must be updated atomically. Only a Toughness value of 0 will not ensure the atomicity of data and parity updates. This should only be used in rare situations where speed is more important than immediate data integrity. A Toughness value of 1 will cause the atomic data and parity update to occur when the data block is freed in the buffer cache. This should be the default setting. Only a Toughness value of 2 will ensure that the data or parity update is on disk (or NVRAM) before the return to the caller. This should only be available to special applications or for folders specified individually by the system administrator. It should be expected that extensive use of the Toughness 2 setting may substantially degrade the throughput of the system, particularly for the files having this setting.

Figure 2:
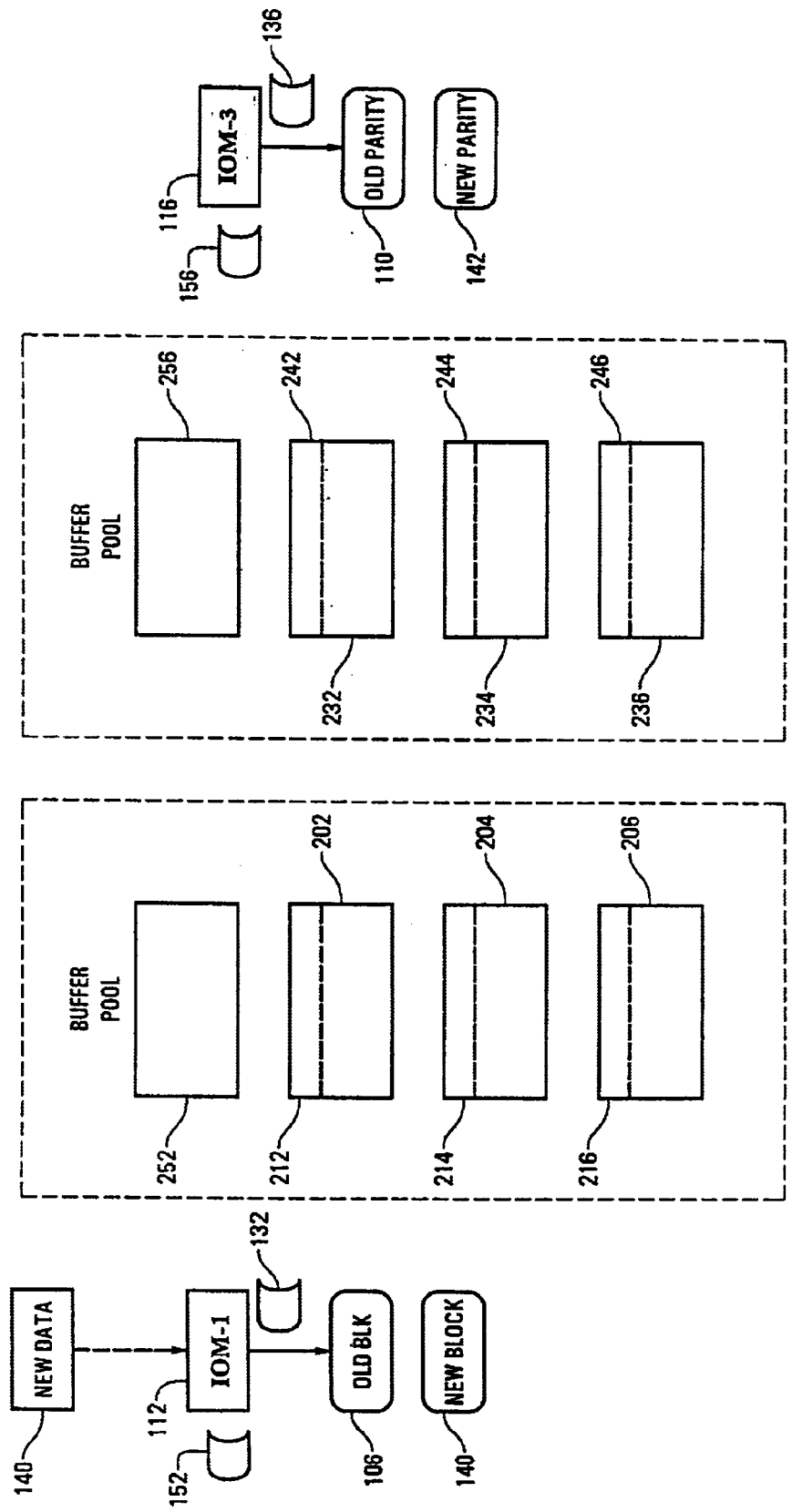
FIG. 2 shows a more detailed block diagram of the operation of the atomic data/parity update of the FIG. 1.
Figures 15, 15A, 15B:
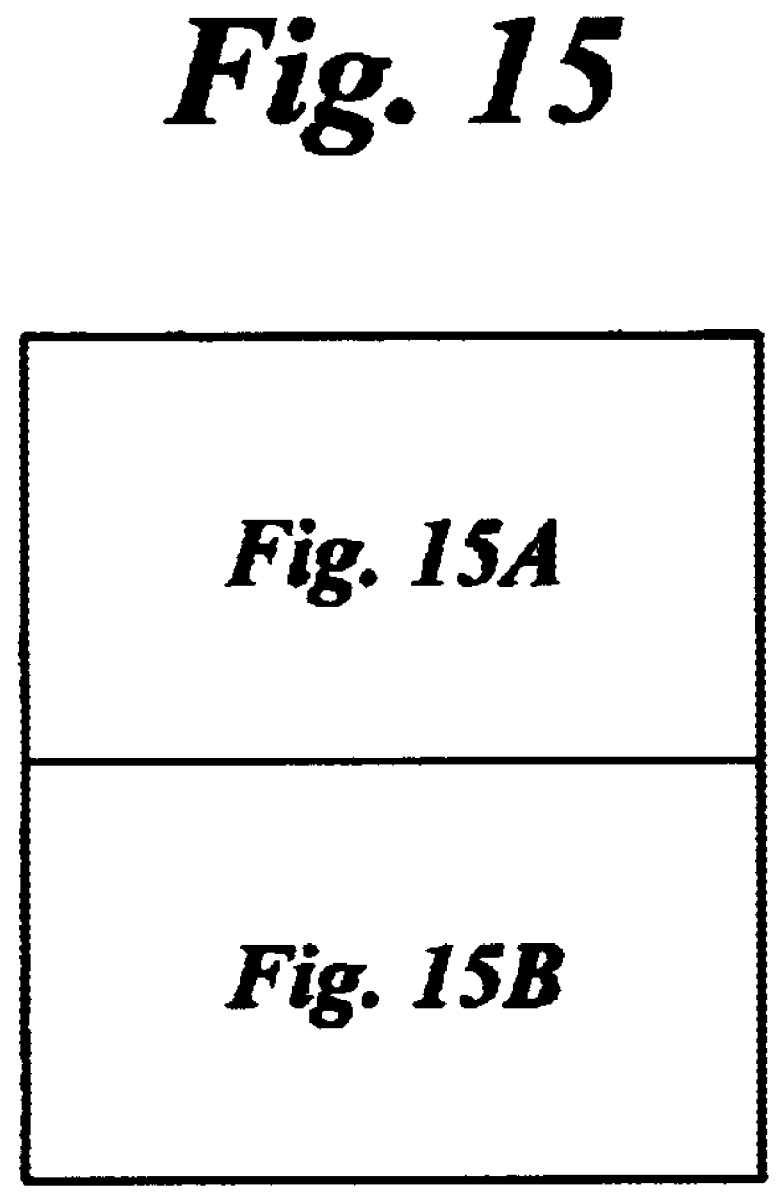

Referring now to FIG. 2 and FIG. 15, a more detailed explanation of the preferred operation of the Data IOM 112 and the Parity IOM 114 from FIG. 1 will be presented. This description provides details on how buffers inside the IOMs and MXs preferably are managed, as well as how addresses preferably are kept in the metadata. A buffer is preferably a faster volatile memory space accessible to the IOM or MX where data is temporarily stored during data transfer operations. FIG. 8 shows a side-by-side flowchart of the process steps performed by the data IOM 112 and the Parity IOM 116.

Data IOM 112 gets a first buffer 202 for data transfer from caller, in this case MX 130. This may be a buffer with a new chunk address if the "old-data" 106 will be needed later. This new chunk allocation will be journaled in the Parity_Update journal 152. This buffer 202 will reference a second "old-data" buffer 204 if one is required. If an "old_data" buffer 204 is required, the two buffers 202, 204 will be acquired atomically. Preferably, the same pf_jrnrange value is assigned to the new data buffer as in the old data buffer. An "old-data" buffer 204 will be required if and only if, one, the data write is to a SPANNED file with parity interval greater than one or, two, the file is mirrored, the data write does not start and end on segment boundaries, and the buffer to be written is not in the buffer cache.

The new block of data 140 is transferred into buffer 202 and the data buffer 202 is marked as TOUGH or the code is modified so that TOUGH is not needed to write the buffer to disk. The IOM 112 modifies the buffer header 212 to set the write_start and write_bytes fields to indicate the range of dirty bytes that will have to be parity updated. The write_start and write_bytes fields should always be maintained to indicate this range. Before the data is written to disk the write_start and write_bytes fields may need to be expanded to be on disk sector boundaries (i.e., multiples of 512 bytes). This may sometimes require a merge of some old data to expand the write_start and write_bytes fields.

The IOM 112 then writes the new data in buffer 202 to a block 222 on disk 122 (in its new location if it was generated earlier and, in that case, only after merging with old-data for partial writes) in foreground but with no blocking. If the file write has a Toughness value 0, the IOM 112 returns to the caller and frees the buffer 202 at this point. In this case, freeing the buffer 202 will update the parity without using the Parity_Update journal. If the file write has a Toughness value 1, the IOM 112 frees the buffer 202 and then returns to the caller after the parity update has been sent to the parity IOM 116. Freeing the buffer with write_start==0 and write_bytes==dtu (write_start and write_bytes indicate the portion of the buffer being changed) will cause the parity update using the Parity_Update journal. If the file write has a Toughness 2 value, free the buffer 202. This will cause hardening of the buffer (i.e., the data write will be changed to foreground) and will cause the parity to be updated, the buffer io_valid event and receipt of the parity complete message before returning to the caller.

Unless the file write has Toughness value of 0, entries in the Parity_Update journal will be used by the sendpn and updatepn procedures to make the parity update atomic with the data update as follows. First, the data IOM 112 creates the first Parity_Update journal entry, with location ID=mj, at the data IOM, containing at least the GFID, lblk and the new disk chunk address for the data update and the disk chunk address for the old-data. If the new disk chunk address is the same as the old disk chunk address, the old disk chunk address field should be NULL. Next, the mj, GFID, lblk, write_start and write_bytes, and the old and new data disk addresses values are sent with the parity update request to the parity IOM 116. At the parity IOM 116, if parity data is not already in the buffer cache in a buffer 232, a buffer 232 is acquired and the old parity data 110 is read into buffer 232. Preferably, the parity IOM uses the readahead flag when reading old parity data 110. Both new and old parity data are needed if old data 106 was needed at the data IOM 112. This is indicated by an old data disk address being non-NULL in the request message. If a new parity disk address is needed (same indication), it will get its own buffer 234 in the buffer cache of the parity IOM 116. The old and new cache pointers for the old and new parity data will be cross-referenced in their cache headesr 242 and 244. If parity data is already in the buffer cache and it does not have a cache pointer for new parity data, use that old parity data and allocate a new cache buffer 234 for the new parity data. If parity data is already in the buffer cache and it already has a pointer to a new cache buffer for new parity data, wait for the buffer io_valid event in the new parity buffer. Then use that as the old cache buffer with a new buffer for the new parity data.

At the parity IOM 116, create an entry, with ID=pj, in the Parity_Update file 156 containing mj, the data IOM's ID, the GFID, lblk of the data, the new and old data disk addresses, the GFID and lblk for the parity data and the new and old parity disk addresses.

At the data IOM 112, preferably a third buffer 206 is acquired and the data IOM 112 will compare the data in buffers 202 and 204 to generate a set of values in buffer 206 representative of the changes or delta between the old data block 106 and the new data block 140. When requested by the parity IOM 116, the data IOM 112 sends this changed data information in buffer 206 as the new parity delta to the parity node 116. This avoids the needs to send both the old data block 106 and the new data block 140 to the parity IOM 116 in order to generate the new parity information.

At the parity IOM 116, the new parity delta is received in a third buffer 236. The information in buffers 236 and 232 are merged to create the information in new parity buffer 234. This new parity-data 140 in buffer 234 is written to disk in its new location if it was generated earlier in foreground with no blocking.

At the data IOM 112, for Toughness 1 updates, the sendpn can complete when the parity data has been sent. When changing an old chunk address to a new chunk address for data and parity, the new chunk address will be marked in the respective data or parity cnode chunk structures when the disk IO is complete. Then, when the respective mj or pj journal entry is on disk, an mj-completed message will be sent (data IOM to parity IOM or parity IOM to data IOM) saying that the new data or parity respectively has been written. When the IO-completed messages is received, that IOM (data or parity) will create, respectively, an mj or pj completed entry in their Parity_Update file.

When old data and old parity buffers are used, the old data and old parity data disk addresses respectively will only be returned to the bitmap after both the new data and the new parity have been written to their new disk addresses. That is, when the io-complete message is received by one IOM from the other IOM and the others buffer has been hardened, then deallocate the old buffer disk address.

Two bits are reserved as part of a state variable value maintained in a cachebuf_t header 252, 256 of each IOM. One bit indicates that the IOM is waiting for confirmation that the other IOM has hardened their buffer. The other bit indicates that the IOM has not sent the message to the other IOM to tell them the buffer was hardened. These flags will be set in modifyBlock as required, and will be cleared by the flushers when appropriate.

When parity updates are done, four different cases come up relative to whether or not there is an old data or parity chunk. When there is an old chunk, the chunk must be retained until both the new data and the new parity chunks are on disk and the Parity_Update journal entry for the local metadata updates has been hardened. The four possibilities are described with reference to FIGS. 16A–16D.

Figure 16A:
FIGS. 16A to 16D show block diagrams of various recover possibilities depending upon the condition of the various update journals.

Referring to FIG. 16A, no old data or old parity chunks are needed in this situation where previous chunks were unused or data is mirrored. The buffers will flow through the code as is conventional.

Figure 16B:
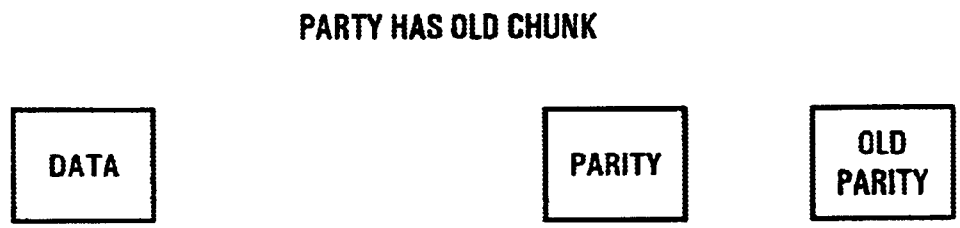

If the situation is as shown in FIG. 16B where the parity has an old chunk, and the data does not, the old parity chunk must not be released until the data and the parity both are on disk. The information on which chunks need to be released is kept in the parity and data buffer headers. When the data block is hardened, it will be put back on the tough list and a mj_hardened entry is put in the Parity_Update journal. When the flusher finds find the hardened buffer on the tough list, a message will be sent (DONTBUMP) to the parity node, and the data will be marked that the message has been sent. The data buffer then can be moved to the free list (because the data has no old chunk release to wait for). When the parity node receives the message it will mark the parity buffer such that we know the data has been hardened.

If the parity buffer is hardened, a pj_hardened entry is put in the Parity_Update journal. If the message has not been received from the data side (the parity buffer is not marked yet), the parity buffer will be put back on the tough list, waiting for the mark. When the flusher sees the mark and the pj_hardened entry is on disk, a pj_complete entry is put in the Parity_Update journal, the chunk used for the old parity is deallocated and the parity buffer is put on the free list.

Figure 16C:
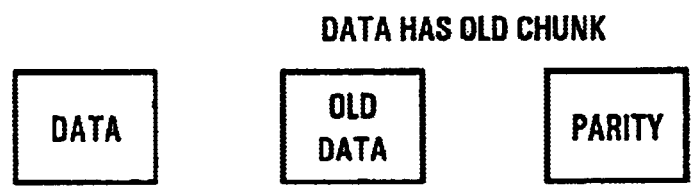

If the situation is as shown in FIG. 16C where the data has an old chunk, and the parity does not, the old data chunk must not be released until both the data and the parity are on disk and the mj_complete Parity_Update journal entry is on disk. The information on which chunk needs to be released is kept in the data block. After the parity block is hardened, it will be put back on the tough list. When the flusher finds it, a message will be sent (DONTBUMP) to the data node, and the parity buffer then can be moved to the free list. When the data node receives the message, it will mark the data buffer such that we know the parity buffer has been hardened.

When the data buffer is hardened, the mj_hardened entry will be written in the Parity_Update journal. If the completed message has not been received from the parity side (i.e., the buffer is not marked yet), the buffer will be put back on the tough list, waiting for the mark. When the flusher sees the mark, the buffer is clean and the mj_hardened entry is on disk, a mj_complete entry is written in the Parity_Update journal, the chunk used for the old data is deallocated and the buffer is put on the free list.

Figure 16D:
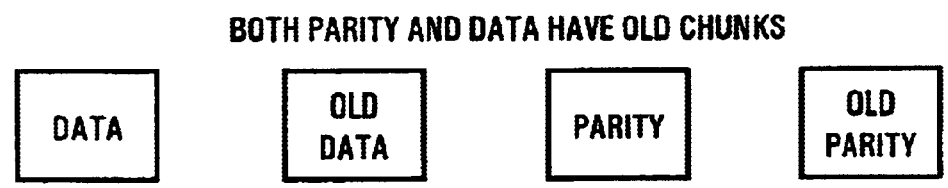

In the situation as shown in FIG. 16D where both the data and the parity have old data, then both chunks must be retained until both the data and the parity are hard on disk their respective mj_hardened or pj_hardened entry is on disk. This is really just an expansion of the two cases above. Each side, after hardening its buffer, will put its hardened entry in the Parity_Update journal and put the buffer back on the tough list (with the DIRTY state cleared). If either flusher finds a hardened block (i.e., not DIRTY) on the tough list, it will send a message over to the other side, and remember (by another mark in the buffer) that it sent the message, so as to only send it once. When such a message is received, the buffer will be marked to indicate that the other side has hardened its buffer. When the flusher finds a clean buffer that has its hardened Parity_Update journal entry is on disk, it will put a complete entry in the Parity_Update journal (mj_complete and pj_complete on the data and parity nodes respectively), deallocate the old chunk and put the buffer back on the free list.

It should be noted that if an IOM attempts to modify a DIRTY buffer again, two cases occur. If the buffer is not associated with a Toughness value greater than 0, indicating that sendpn has NOT been invoked, further modifications of the buffer will use the same "old-data-chunk". Thus there is no need to get another new chunk. If the buffer is associated with a Toughness value of greater than 0, indicating that sendpn HAS been invoked, then the modifyBlock subroutine will wait for the data buffer (soon to be the "old-data" buffer) to harden. The subroutine then clears both of the above bits in the new data buffer in which the next data modification will occur. The old data buffer may still have one of these bit set and the IOM may still be waiting for the message to enable deallocating the old chunk.

In normal operations or when a clean shutdown has been performed, the Parity_Update journal is not needed to ensure the atomicity of a data and parity updates. The Parity_Update journal is only needed when there has been an abnormal termination to the parity update process, either because all filesystem operations were abruptly interrupted or because one or the other of the data IOM or the parity IOM failed in the middle of the process.

The following will describe how the Parity_Update journal is used to ensure atomicity of the update, no matter where it may have been interrupted. Cases 1 through 4 below cover the possibilities where the entire filesystem is being rebooted and the entire Parity_Update journal has been read on each IOM.

Case 1: No Parity Update entry is found for this update.

If no Parity_Update entry is found then neither data nor parity will have been written to disk.

Case 2: A Parity Update entry at the data IOM is found with the data lblk and disk chunk address (old and new if both were needed), but no Parity Update entry for this data is found on the parity IOM.

If the new data has been written to disk, the parity data needed for a parity update can be generated from the disk addresses. After journal replay, the metadata for the data block in the cnode is made to have the new disk chunk address if the mj_hardened entry has been written to disk and will have the old disk chunk address if the mj_complete entry has not been written to disk. If the metadata has the new disk address, the new data buffer is reconstructed and, if appropriate, the old-data buffer in the buffer cache of the data IOM using the old disk chunk address will complete the data/parity update. If the metadata does not have the new disk address, then neither IOM has started the update and the file is already consistent.

Case 3: A Parity Update entry at the data IOM is found with the data lblk and disk chunk address(old and new if both were needed), and a corresponding Parity Update entry is found on the parity IOM.

Five cases are possible.

a) There is no new disk chunk address in either Parity_Update entry.

This indicates that the data and parity are mirrored or new. If there is a hardened entry for this mj entry in the Parity_Update journal of either data or parity node, then that nodes disk block data should be written to the other node. If neither has a hardened Parity_Update journal entry, then the value from the data disk block should be written into the parity to make the data and parity consistent. The data is chosen over the parity because it had the earlier possibility of being hardened.

b) There is a new disk chunk address in the Parity_Update entries on both IOMs but neither hardened journal entry is on disk in its Parity_Update journal (thus, its respective cnode metadata can not be the new data).

Neither update has been written to metadata. Thus no action is required to make the data and parity consistent. The new disk chunks should both be returned to the bitmap.

c) There is a new disk chunk address in both Parity_Update entries but only the data hardened journal entry is on disk in its Parity_Update journal (thus, only its cnode metadata might have been hardened).

If the new disk chunk address is in the Parity_Update journal then the old disk chunk address is also. The new data buffer is read from its new disk chunk address and the old-data buffer is read from the old disk chunk address into the buffer cache of the data IOM and the new data buffer is marked as dirty which will cause the data/parity update to be completed.

d) There is a new disk chunk address in both the data and the parity Parity_Update entries and both hardened journal entries are on disk in their respective Parity_Update journals (thus, either cnode metadata might have been hardened).

Both data and parity updates have been written to disk. Thus no further action is required to make the data and parity consistent. Both data and parity metadata must be updated to contain the new chunk addresses and use-bits. The old disk addresses should both be returned to the bitmap.

e) There is a new disk chunk address in both Parity_Update entries but only the parity hardened journal entry is on disk in its Parity_Update journal (thus, only its cnode metadata might have been hardened).

This is the most difficult case. One could return the parity metadata to the old disk address, but it is preferable to update the data to the new value. To do this, first the parity delta is computed by XORing the new parity data and the old parity data. Then this delta is sent to the data IOM and the new data is reconstructed in the cache of the data IOM by XORing the delta with the old data (read by using the old disk address). The new data is marked as tough with the new disk chunk address and the appropriate Parity_Update state. When this new data is written to disk, a mj_hardened entry is put in the Parity Update journal, the metadata will be updated and message will be sent to the parity node indicating the disk IO completion. A parity hardened message will be returned from the parity IOM, whereupon an mj_complete entry will be put in the Parity_Update journal to indicate the finish of the update, and the old chunk will be deallocated from the bitmap. At the parity IOM, when the data hardened message is received, the parity hardened message will be sent back to the data IOM. The pj_complete entry will be put in the Parity_Update journal to indicate the finish of the update, and the old chunk will be deallocated from the bitmap.

Case 4: A Parity Update entry at the parity IOM is found with the data lblk and disk chunk address (old and new if both were needed) for both data and parity data, but no Parity Update journal entry for this data is found on the data IOM.

Three cases are possible.

a) There is no new disk chunk address in the Parity_Update entry.

This indicates that the data and parity are mirrored. The value from the data disk chunk address should be written into the parity disk chunk address to make the data and parity consistent. The data is chosen over the parity because it had the earlier possibility of being hardened.

b) There are new disk addresses in the Parity_Update journal entry on the parity IOMs, but the pj_hardened journal entry is not on disk in the Parity_Update journal.

Neither update has been written to the metadata on disk. Thus no action is required to make the data and parity consistent. The new disk address at the parity IOM should both be returned to the bitmap.

c) There are new disks addresses in the Parity_Update entry and the parity hardened journal entry is on disk in its Parity_Update journal (thus, its cnode metadata might have been hardened).

This again is the most difficult case. One could return the parity metadata to the old disk address, but it is preferable to update the data to the new value. To do this, first the parity delta of the new parity data and the old parity data is computed. (The old parity data is certain to be there until the new data has been written to disk at the data IOM.) Then this delta is sent to the data IOM and the new data in the cache of the data IOM is reconstructed by XORing the delta with the old data (using the old disk address). The buffer is marked as tough and dirty with the new disk chunk address, a new mj entry and Parity_Update journal and replay state. When it is written to disk, the metadata will be updated and the mj_hardened message sent to the parity IOM to finish of the update. The pf_jrnrange.oldest and pf_jrnrange.newest will be made NULL in that new data buffer. A parity hardened message will be returned from the parity IOM, whereupon an mj_complete entry will be put in the Parity_Update journal to indicate the finish of the update, and the old chunk will be deallocated from the bitmap.

At the parity IOM, when the data hardened message is received, the parity hardened message will be sent back to the data IOM. The pj_complete entry will be put in the Parity_Update journal to indicate the finish of the update, and the old chunk will be deallocated from the bitmap.

If only one node has gone down and the proxy has been invoked as described in co-pending application entitled "Self-Healing Computer Storage System" as previously referenced, the proxy should read the mirrored Parity_Update journal to find unfinished parity updates. That is, there are Parity_Update entries for parity updates where no disk IO completion entry has been found in the Parity_Update journal to indicate the finish of the update. In the case where incomplete Parity_Update entries are found where the down node was doing a sendpn or a updatepn procedure, the proxy should mark the chunk of the lblk in the cnode metadata of the data file or parity file respectively as CHUNK_NOTBUILT.

Other entries for chunk allocations and deallocations in the Parity_Update journal will assure that the allocation or deallocation operation has been completed sequentially in the cnode cache and the relevant bitmap as the journal is replayed on each IOM individually. Any other changes to the chunk structures should also be journaled. Updates to cnode->eof should also be journaled. These should indicate whether the file is growing or being truncated.

Although the preferred embodiment has been described, it will be recognized that numerous changes and variations can be made and that the scope of the present invention is intended to be defined by the claims.

What is claimed is:

1. A controller fault recovery system for an array storage system for storing data objects including at least one parity group having a number N of data blocks and a parity block computed from the N data blocks comprising:

an array of storage devices;

at least N+1 controllers, each controller operably connected to a unique portion of the array of storage devices; and a distributed file system having at least one input/output manager (IOM) routine for each controller, each IOM routine including:

means for controlling access to the unique portion of the array of storage devices associated with that controller;

means for maintaining a journal reflecting a state of all requests and commands received and issued for that IOM routine; and means for reviewing the journal and the state of all requests and commands received and issued for that IOM routine in response to a notification that at least one of the IOM routines has experienced an unscheduled stop and publishing any unfinished request and commands for the at least one failed IOM routine.

2. The system of claim 1 wherein if the notification is an external notification that a single IOM has failed, the distributed file system keeps running and the fault recovery system uses a proxy arrangement to recovery, and wherein if the notification is a notification that all of the IOMs experienced an unscheduled stop because more than one IOM has failed, the distributed file system is restarted and the notification occurs internally as part of the restart procedure for each IOM.

3. The system of claim 2 wherein the proxy arrangement assigns a proxy IOM routine for each IOM routine, the proxy IOM routine being an IOM routine different than the assigned IOM routine that includes:

means for monitoring the assigned IOM routine for a failure and, in the event of a failure of only the assigned IOM routine, issuing a notification to all other IOM routines;

means for receiving from all other IOM routines identifications of any unfinished requests or commands for the assigned IOM routine that has failed; and means for marking in a metadata block for the assigned IOM routine a state of any data blocks, parity blocks or meta-data blocks associated with the unfinished requests or commands reflecting actions needed for each such block when the assigned IOM routine recovers.

4. The system of claim 2 wherein in the event of a failure of more than one of the IOM routines the distributed file system performs an unscheduled stop of all IOM routines and, upon recovery of at least N of the IOM routines after the unscheduled stop, each IOM routine reviews the journal and state for that IOM routine and the publication of any unfinished requests or commands for that IOM routine from all of the other IOM routines and reconstructs each data block, parity block or metadata block in response, so as to insure that any updates to a block of data and its block of parity are atomic.

5. A computer-implemented method of storing data objects in an array storage system, the data objects including at least one parity group having a number N of data blocks and a parity block computed from the N data blocks, wherein the data objects are stored in the array storage system under software control of a distributed file system having at least a number N+1 of input/output manager (IOM) routines, each IOM routine controlling access to a unique portion of the array storage system and having a plurality of buffers to temporarily store blocks to be transferred in/out of that portion of the array storage system, the method comprising:

(a) receiving a write request at a first IOM to store a new data block and, in response:

(a1) issuing a read command to read an old data block corresponding to the new data block if the old data block is not already in a first buffer in the first IOM, the old data block having a first location in a meta-data structure for the distributed file system that contains an old disk address for the old data block;

(a2) allocating a new disk address for the new data block;

(a3) transferring the new data block into a second buffer in the first IOM;

(a4) issuing a write command to write the new data block from the second buffer at the new disk address;

(a5) making a journal entry that the write command was issued;

(a6) sending an update parity request to a second IOM associated with a parity block of the parity group that includes the old data block;

(a7) determining changes between the old data block and the new data block;

(a8) sending the changes between the old data block and the new data block to the second IOM in response to a request from the second IOM;

(a9) releasing the first buffer in response to a confirmation from the second IOM that the changes between the old data block and the new data block have been received;

(a10) receiving a response to the write command that the new data block has been written;

(a11) changing the old disk address to the new disk address in the first location in the meta-data structure;

(a12) releasing the second buffer;

(a13) sending a message to the second IOM that the write command was completed; and (a14) deallocating space reserved for the old data block in the meta-data structure and making a journal entry that the write command was completed in response to receiving a message from the second IOM that the parity update was completed; and (b) receiving the update parity request at the second IOM and, in response:

(b1) making a journal entry that the update parity request was received;

(b2) sending a request to the first IOM for the changes between the old data block and the new data block;

(b3) issuing a read command to read an old parity block corresponding to the parity block of the parity group that includes the old data block if the parity block is not already in a first buffer in the second IOM, the old parity block having a second location in the meta-data structure for the distributed file system that contains an old disk address for the old parity block;

(b4) receiving in a second buffer in the second IOM the changes between the old data block and the new data block from the first IOM and sending the confirmation that the changes between the old data block and the new data block have been received;

(b5) allocating a new disk address for a new parity block and a third buffer in the second IOM;

(b6) generating the new parity block in the third buffer based on the changes between the old data block and the new data block and the old parity block;

(b7) releasing the first buffer and the second buffer;

(b8) issuing a write command to write the new parity block in the third buffer to the new disk address for the new parity block;

(b9) receiving a response to the write command that the new parity block has been written;

(b10) changing the old disk address for the old parity block to the new disk address for the new parity block in the second location in the meta-data structure;

(b11) making a journal entry that the update parity request was completed;

(b12) sending a message to the first IOM that the update parity request was completed; and (b13) deallocating space reserved for the old parity block in the meta-data structure in response to receiving a message from the first IOM that the write command was completed.

6. The method of claim 5 wherein the write request to store the new data block includes a toughness value that is an indication of when a write request complete response should be returned based on a user chosen value of the desired balance between response time and reliability and the method further comprises:

if the toughness value requires the new data block and the new parity block to be confirmed as written to the redundant storage array, returning a write request complete response after step (a13); and if the toughness value requires atomicity of the new data block and the new parity block but does not require the new data block and the new parity block to be confirmed as written to the redundant storage array, returning a write request complete response after step (a8).

7. The method of claim 6 wherein the method further comprises:

if the toughness value does not requires atomicity of the new data block and the new parity block, returning a write request complete response after step (a4).

8. The method of claim 5 wherein step (a7) is accomplished by comparing the contents of the first buffer and the second buffer in the first IOM and generating a delta block that is stored in a third buffer in the first IOM and wherein step (b4) stores the delta block in the second buffer in the second IOM and step (b5) compares the old parity block in the first buffer in the parity IOM with the delta block in the second buffer of the second IOM and generates the new parity block that is stored in the third buffer in the second IOM.

9. The method of claim 5 wherein the array storage system is not provided with non-volatile random access memory for the journal and wherein at least steps (a5), (a14), (b1) and (b11) further comprise the step of receiving a response that the journal has been flushed to the array storage system.

10. The method of claim 5 wherein at least steps (a11), (a14), (b10) and (b13) further comprise the step of receiving a response that the metadata has been flushed to the array storage system.

11. The method of claim 5 wherein the array storage system is provided with non-volatile random access memory (NVRAM) and the journal is recorded in the NVRAM.

12. The method of claim 5 wherein the method further comprises:
(c) in the event of an unscheduled stop of the array storage system, recovering the data parity group of a data object by reviewing the journal entries for both the first IOM and the second IOM and reconstructing the data block or the parity block in response if necessary.

13. The method of claim 12 wherein the first IOM is a data IOM for a given parity group and the second IOM is a parity IOM for the parity group and wherein step (c) comprises:
(c1) making no changes to the data parity group or the location in the meta-data structure of the old data disk address and the old parity disk address if:
(c1a) no journal entry exist for either the data IOM or the parity IOM for the data parity group;
(c1b) a journal entry exists that the write command was issued but not completed and there is no journal entry that the parity update request was issued;
(c1c) a journal entry exists that the write command was issued but not completed and a journal entry exists that the parity update request was issued but not completed; or
(c1d) a journal entry exists that the write command was completed and a journal entry exists that the parity update request was completed;
(c2) reconstructing the new parity block from the old data block and the new data block if a journal entry exists for the data IOM that the write command was completed and no journal entry exists for the parity IOM that the update parity request was completed; and
(c3) reconstructing changes to the parity from the old parity block and the new parity block and then reconstructing the new data block from the old data block and the changes to the parity if a journal entry exists for the data IOM that the write command was issued but not completed and a journal entry exists for the parity IOM that the update parity request was completed.

14. The method of claim 13 wherein the journal entry of at least steps (a5), (a14), (b1) and (b11) includes the corresponding new disk address and old disk address for the data or parity, respectively, and wherein step (c) further comprises the step of determining whether the new disk address or the old disk address matches a disk address in the meta-data structure for the data or parity, respectively.

15. A computer-implemented method of storing data objects in an array storage system, the data objects including at least one parity group having a number N of data blocks and a parity block computed from the N data blocks, wherein the data objects are stored in the array storage system under software control of a distributed file system having at least a number N+1 of input/output manager (IOM) routines, each IOM routine controlling access to a unique portion of the array storage system, the method comprising:
at a first IOM:
receiving a write request to store a new block of data for a data object;
issuing an update parity request to a second IOM associated with a parity block corresponding to the new block of data;
issuing a write command to write the new block of data to the storage system; and
receiving a write command complete from the storage system for the new block of data;
at the second IOM:
receiving the update parity request;
computing a new block of parity for the parity group that includes the new block of data; and
issuing a write command to write the new block of parity; and
receiving a write command complete from the storage system for the new block of parity;
for each of the first and second IOM, maintaining a journal of all requests and commands received and issued; and
in the event of an unscheduled stop of the array storage system, recovering the data parity group of the data object by reviewing the journal entries for both the first and second IOM and reconstructing the data block or the parity block in response if necessary.

16. The method of claim 15 wherein each IOM makes a journal entry in response to:
a write data command from a requestor;
an update parity request from another IOM;
a write data command complete from the array storage system;
a write parity command issued in response to the update parity request from another IOM;
a write parity command complete from the array storage system; and
an update parity request complete from another IOM.

17. The method of claim 15 wherein each IOM maintains its own journal.

18. A computer-implemented method of storing data objects in an array storage system, the data objects including at least one parity group having a number N of data blocks and a parity block computed from the N data blocks, wherein the data objects are stored in the array storage system under software control of a distributed file system having at least a number N+1 of input/output manager (IOM) routines, each IOM routine controlling access to a unique portion of the storage system, the method comprising:
at a first IOM:
receiving a write request to store a new block of data for a data object;
issuing an update parity request to a second IOM associated with a parity block corresponding to the new block of data;
issuing a write command to write the new block of data to the storage system; and
receiving a write command complete from the storage system for the new block of data;
at the second IOM:
receiving the update parity request;
computing a new block of parity for the parity group that includes the new block of data; and
issuing a write command to write the new block of parity; and
receiving a write command complete from the storage system for the new block of parity;
at a third IOM that is designated as a proxy for the first IOM:
monitoring requests to the first IOM; and
in the event that the first IOM does not respond to a request, assuming responsibility for responding to the request;
for each of the first and second IOMs, maintaining a journal of all requests and commands received and issued; and in the event that the first IOM does not respond to a request, recovering the data parity group of the data object by reviewing the journal entries for both the first and second IOM and reconstructing the data block from the parity block.

19. An array storage system for storing data objects including at least one parity group having a number N of data blocks and a parity block computed from the N data blocks comprising:

an array of storage devices; and a distributed file system having at least a number N+1 of input/output manager (IOM) routines, each IOM routine controlling access to a unique portion of the array of storage devices and maintaining a journal of all requests and commands received and issued for that IOM wherein a first IOM responds to a write request to store a new block of data for a data object and issues an update parity request to a second IOM associated with a parity block corresponding to the block of data;

the second IOM computes a new block of parity for the parity group that includes the new block of data; and in the event of an unscheduled stop of a portion of the array of storage devices controlled by either the first IOM or second IOM, the distributed file system reviews the journal for both the first IOM and second IOM once the first and second IOM are both restarted and reconstructs the data block or the parity block in response so as to insure that any updates to the new block of data or new block of parity are atomic.

20. The system of claim 19 wherein the distributed file system further includes a third IOM designated as a proxy to the first IOM and wherein, in the event that the first IOM does not respond to a request and another IOM publishes that the first IOM is not available, the third IOM assumes responsibility for responding to the request and marks a meta-data file associated with the first IOM that any write requests for data blocks and parity blocks to the first IOM that were handled by the third IOM need to be reconstructed once the first IOM is restarted.

21. The system of claim 20 wherein the third IOM assumes responsibility for the first by starting a new IOM routine on the controller for the third IOM where the new IOM routine acts as a proxy IOM for the first IOM.

22. The system of claim 19 wherein each of the IOMs other than the first IOM respond to the publication that the first IOM is not available by reviewing the journal and state for that IOM and publishing any unfinished requests or commands between that IOM and the first IOM.

* * * * *